United States Patent
Nagata et al.

(10) Patent No.: US 11,306,110 B2
(45) Date of Patent: Apr. 19, 2022

(54) METHOD FOR PRODUCING HERBICIDE INTERMEDIATE

(71) Applicants: MMAG Co., Ltd., Tokyo (JP); Nat'l Inst. of Advanced Industrial Science & Tech., Tokyo (JP)

(72) Inventors: Hirotaka Nagata, Tokyo (JP); Nobuto Minowa, Tokyo (JP); Nozomu Nakanishi, Tokyo (JP); Katsuya Shimura, Ibaraki (JP); Tadahiro Fujitani, Ibaraki (JP)

(73) Assignees: MMAG Co., Ltd., Tokyo (JP); National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 16/629,742

(22) PCT Filed: Jul. 5, 2018

(86) PCT No.: PCT/JP2018/025543
§ 371 (c)(1),
(2) Date: Jan. 9, 2020

(87) PCT Pub. No.: WO2019/013095
PCT Pub. Date: Jan. 17, 2019

(65) Prior Publication Data
US 2020/0231612 A1    Jul. 23, 2020

(30) Foreign Application Priority Data

Jul. 12, 2017 (JP) ............................. JP2017-135963
Mar. 30, 2018 (JP) ............................. JP2018-069264

(51) Int. Cl.
*C07F 9/08* (2006.01)

(52) U.S. Cl.
CPC ..................................... *C07F 9/08* (2013.01)

(58) Field of Classification Search
CPC ............ C07F 9/52; B01J 23/04; B01J 23/755
USPC ........................................................ 568/16
See application file for complete search history.

(56) References Cited

U.S. PATENT DOCUMENTS

| | | | |
|---|---|---|---|
| 2,137,792 | A | 11/1938 | Woodstock |
| 3,210,418 | A | 10/1965 | Pianfetti |
| 3,709,932 | A | 1/1973 | Uhing |
| 4,101,573 | A | 7/1978 | Gehrmann et al. |
| 4,518,538 | A | 5/1985 | Gehrmann et al. |
| 2017/0313731 | A1 | 11/2017 | Ressel et al. |

FOREIGN PATENT DOCUMENTS

| | | |
|---|---|---|
| CN | 105330693 A | 2/2016 |
| CN | 106117267 A | 11/2016 |
| EP | 0082350 A1 | 6/1983 |
| EP | 0999216 A2 | 5/2000 |
| JP | 48-091019 | 11/1973 |
| WO | 2016079164 A1 | 5/2016 |

OTHER PUBLICATIONS

Machine translation CN105330693.*
Liu et al. Guangzhou Huagong (2015), 43(16), 111-113, 164.*
Pianfetti et al., "Formation of Phosphonous Dichlorides by Alkylation of Phosphorus Trichloride with Methane or Ethane," Journal of the American Chemical Society, Mar. 5, 1962, vol. 84, pp. 851-854.
Gui et al., "The Catalytic Synthesis of Dichloromethylphosphine with Perovskite Type La0.7K0.3CoO3," Journal of Hebei Normal University, Natural Science Edition, Mar. 2009, vol. 33, No. 2, pp. 210-213, English abstract only.
Ma et al., "Catalytic Synthesis of Methyl Phosphonic Dichloride by Perovskite-type Oxides La0.9K0.1CoO3," Chinese Journal of Synthetic Chemistry, 2009, vol. 17, No. 3, pp. 383-384, English abstract only.
Cui et al., "Synthesis of Methyl Phosphonic Dichloride on Hexaaluminate LaMnAl11O19-α Catalyst," Petrochemical Technology, 2008, vol. 37, Issue 10, pp. 1045-1048, English abstract only.
International Search Report issued in corresponding International Patent Application No. PCT/JP2018/025543, dated Aug. 28, 2018.
Written Opinion of the International Search Authority issued in corresponding International Patent Application No. PCT/JP2018/025543, dated Aug. 28, 2018.
Extended European Search Report issued in corresponding European Application No. 18831006.4, dated Feb. 12, 2021.
Cui et al., "Synthesis of Methyl Phosphonic Dichloride on Hexaaluminate LaMnAl11O19-α Catalyst," Petrochemical Technology, 2008, vol. 37, Issue 10, pp. 1045-1048.
Ma et al., "Catalytic Synthesis of Methyl Phosphonic Dichloride by Perovskite-type Oxides La0.9K0.1CoO3," Chinese Journal of Synthetic Chemistry, 2009, vol. 17, No. 3, pp. 383-384.
Intellectual Property Office of Singapore, Singapore Written Opinion dated Apr. 1, 2021 issued in corresponding Singaporean Patent Application No. 11202000158S.
Indian Patent Office, Examination Report issued in corresponding Indian Application No. 202017002035 dated Jul. 1, 2021.

* cited by examiner

*Primary Examiner* — Ana Z Muresan
(74) *Attorney, Agent, or Firm* — Carmody Torrance Sandak & Hennessey LLP

(57) ABSTRACT

A method for producing methyldichlorophosphane, the method including: allowing methane and phosphorus trichloride to react in the presence of an additive using a metal compound, or a metal compound carried on a carrier, or both thereof.

3 Claims, 5 Drawing Sheets

METHOD FOR PRODUCING HERBICIDE INTERMEDIATE

TECHNICAL FIELD

The present invention relates to a method for producing methyldichlorophosphane that is useful as, for example, a production intermediate of herbicides, 2-amino-4-(hydroxymethylphosphinyl)butanoic acid and L-2-amino-4-(hydroxymethylphosphinyl)butanoic acid.

BACKGROUND ART

It is already known that methyldichlorophosphane can be used as a production intermediate of 2-amino-4-(hydroxymethylphosphinyl)butanoic acid and L-2-amino-4-(hydroxymethylphosphinyl)butanoic acid having herbicidal activities (see, for example, Patent Literature 1).

Known methods for producing methyldichlorophosphane include reaction in the presence of aluminum chloride (see, for example, Patent Literature 2), a method using a highly toxic compound such as phosgene and carbon tetrachloride (see, for example, Patent Literatures 3 to 5), a method using thionyl chloride and sulfuryl chloride (see, for example, Patent Literature 6), a method using ultraviolet rays (see, for example, Patent Literature 7), a method using oxygen as an additive (see, for example, Patent Literature 8 and Non-Patent Literature 1), and a method using a composite-type, perovskite-type catalyst (see, for example, Non-Patent Literatures 2 to 4).

However, the method of Patent Literature 2 requires aluminum chloride in an equivalent amount or more, and has a problem from the economical viewpoint and a problem with a large amount of metal wastes formed.

The methods of Patent Literatures 3 to 5 use highly toxic compounds such as phosgene and carbon tetrachloride, and also has a problem with a large amount of by-products formed as a result of change of these compounds themselves. Further, these compounds have a boiling point close to the boiling point of the product, methyldichlorophosphane, which makes it difficult to perform purification by distillation. As a result, there is a problem that these methods require high-level facilities and extra thermal energy. There is another problem that clogging of reaction tubes occurs due to the formation of solid by-products.

The method of Patent Literature 6 has a problem with a large amount of by-products formed as a result of change of the compounds themselves that are used. Further, these compounds have a boiling point close to the boiling point of the product, methyldichlorophosphane, which similarly makes it difficult to perform purification by distillation. As a result, there is a problem that this method requires high-level facilities and extra thermal energy.

The method of Patent Literature 7, which uses ultraviolet rays, has a problem with a low yield of the product.

The methods of Patent Literature 8 and Non-Patent Literature 1, which use oxygen as an additive, have problems such as a low yield of the product, formation of by-products such as methyldichlorophosphinic acid, and corrosion of the facilities, as well as formation of extra wastes.

The methods of Non-Patent Literatures 2 to 4, which synthesize methyldichlorophosphane by using a composite-type, perovskite-type catalyst, have problems with low yield and corrosion of the catalyst.

CITATION LIST

Patent Literature

Patent Literature 1: Japanese Patent Application Laid-Open No. 48-91019
Patent Literature 2: U.S. Pat. No. 2,137,792
Patent Literature 3: U.S. Pat. No. 3,709,932
Patent Literature 4: U.S. Pat. No. 4,101,573
Patent Literature 5: European Patent Application Publication No. 0082350
Patent Literature 6: International Publication No. WO2016/079164
Patent Literature 7: European Patent Application Publication No. 0999216
Patent Literature 8: U.S. Pat. No. 3,210,418

Non-Patent Literature

Non-Patent Literature 1: JOHN A. PIANFETTI et al., JOURNAL OF THE AMERICAN CHEMICAL SOCIETY, 1962, Vol. 84, pp. 851 to 854
Non-Patent Literature 2: CUI Xue-jun et al., JOURNAL OF HEBEI NORMAL UNIVERSITY/Natural Science Edition/, 2009, Vol. 33, Issue 2
Non-Patent Literature 3: MA Zhi-hong et al., Chinese Journal of Synthetic Chemistry, 2009, Vol. 17, Issue 3, pp. 383 to 384
Non-Patent Literature 4: CUI Xue-jun et al., PETROCHEMICAL TECHNOLOGY, 2008, Vol. 37, Issue 10, pp. 1045 to 1048

SUMMARY OF INVENTION

Technical Problem

The present invention aims to solve the existing problems and achieve the following object. Specifically, an object of the present invention is to provide a method that can produce methyldichlorophosphane useful as, for example, an intermediate of an herbicide at an excellent yield, while giving less environmental loads due to formation of wastes and suppressing formation of by-products.

Solution to Problem

The present inventors have found that by allowing methane and phosphorus trichloride to react in the presence of an additive using a metal compound, or a metal compound carried on a carrier, or both thereof, it is possible to produce methyldichlorophosphane at an excellent yield while suppressing formation of wastes and by-products in the reaction. On the basis of this finding, the present invention has been completed.

Means for Solving the Above Problems are as Follows

<1> A method for producing methyldichlorophosphane, the method including:
allowing methane and phosphorus trichloride to react in the presence of an additive using a metal compound, or a metal compound carried on a carrier, or both thereof.

Advantageous Effects of Invention

According to the present invention, it is possible to solve the existing problems and achieve the above object and to provide a method that can produce methyldichlorophosphane useful as, for example, an intermediate of an herbicide at an excellent yield, while giving less environmental loads due to formation of wastes and suppressing formation of by-products.

Figure 1:
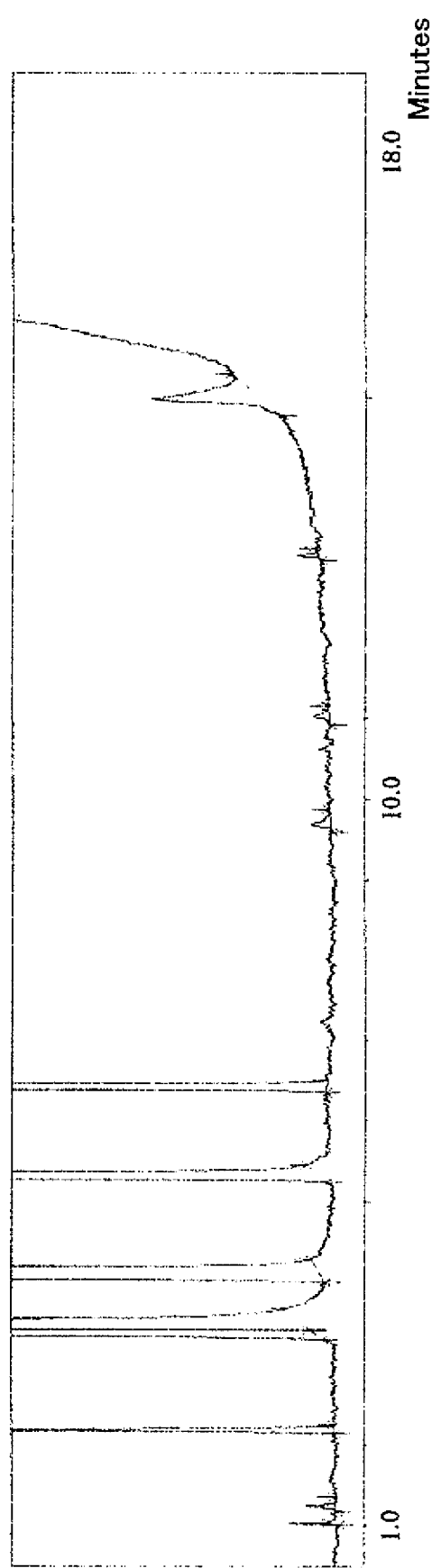
FIG. 1 is a chart of spectral data obtained from gas chromatography mass spectrometry of a reaction liquid of Example 15.

DESCRIPTION OF EMBODIMENTS (Method for Producing Methyldichlorophosphane)

A method for producing methyldichlorophosphane of the present invention includes a reaction step of allowing methane and phosphorus trichloride to react in the presence of an additive using a metal compound, or a metal compound carried on a carrier, or both thereof; and if necessary further includes other steps.

<Reaction Step>

—Additive—

In the present invention, the additive is not particularly limited and may be appropriately selected depending on the intended purpose. Examples thereof include oxygen and chlorine. These may be used alone or in combination.

The oxygen may be in the form consisting of oxygen only, or may be the form containing oxygen, such as air.

The additive is preferably oxygen and chlorine.

—Metal Compound, or Metal Compound Carried on Carrier, or Both Thereof—

Regarding the metal compound, or the metal compound carried on the carrier, or both thereof, any one of the metal compound and the metal compound carried on the carrier may be used, or both of the metal compound and the metal compound carried on the carrier may be used. The metal compound and the metal compound carried on the carrier preferably those having low toxicity.

An amount of the metal compound, or the metal compound carried on the carrier, or both thereof used is not particularly limited and may be appropriately selected depending on the intended purpose.

—Metal Compound—

The metal compound, or the metal compound used in the metal compound carried on the carrier is not particularly limited and may be appropriately selected depending on the intended purpose. Examples thereof include a metal halide, a metal nitrate, a metal nitrite, a metal sulfate, a metal sulfite, a metal oxide, a complex metal oxide, a metal peroxide, a metal halide complex, zeolite, a metal boride, a metal silicide, a metal nitride, a metal sulfide, a metal phosphide, a metal antimonide, a metal selenide, a metal carbide, a metal chlorate, a metal perchlorate, a metal bromate, a metal perbromate, a metal iodate, a metal periodate, a metal oxalate, a metal carbonate, a metal phosphate, a metal phosphite, a metal hypophosphite, a metal borate, a metal chromate, a metal silicate, a metal arsenate, a metal permanganate, a simple metal, and an alloy. These may be used alone or in combination. Among them, a metal halide, a metal oxide, a metal boride, a metal carbide, an alloy, and a simple metal are preferable.

The metal compound may be used for the reaction as it is, or may be used after pre-treatment for activation.

In the present invention, the metal refers to a metal element and a semimetal element. Examples of the semimetal element include boron, silicon, germanium, arsenic, antimony, tellurium, selenium, polonium, and astatine.

In the present invention, the halogen element refers to a Group 17 element in the Periodic Table. Examples of the halogen element include fluorine, chlorine, bromine, and iodine.

—Metal Halide—

In the present invention, the metal halide refers to a compound in which a halogen element is bound via an ionic bond or a covalent bond to an element having lower electronegativity than the halogen element. Examples of the metal halide include lithium fluoride, beryllium fluoride, sodium fluoride, magnesium fluoride, aluminum fluoride, potassium fluoride, calcium fluoride, scandium fluoride, titanium fluoride, vanadium fluoride, chromium fluoride, manganese fluoride, iron fluoride, cobalt fluoride, nickel fluoride, copper fluoride, zinc fluoride, gallium fluoride, germanium fluoride, arsenic fluoride, selenium fluoride, rubidium fluoride, strontium fluoride, yttrium fluoride, zirconium fluoride, niobium fluoride, molybdenum fluoride, ruthenium fluoride, rhodium fluoride, palladium fluoride, silver fluoride, cadmium fluoride, indium fluoride, tin fluoride, antimony fluoride, tellurium fluoride, cesium fluoride, barium fluoride, lanthanum fluoride, hafnium fluoride, tantalum fluoride, tungsten fluoride, rhenium fluoride, osmium fluoride, iridium fluoride, platinum fluoride, gold fluoride, mercury fluoride, thallium fluoride, lead fluoride, bismuth fluoride, cerium fluoride, praseodymium fluoride, neodymium fluoride, samarium fluoride, europium fluoride, gadolinium fluoride, terbium fluoride, dysprosium fluoride, holmium fluoride, erbium fluoride, thulium fluoride, ytterbium fluoride, lutetium fluoride, lithium chloride, beryllium chloride, sodium chloride, magnesium chloride, aluminum chloride, potassium chloride, calcium chloride, scandium chloride, titanium chloride, vanadium chloride, chromium chloride, manganese chloride, iron chloride, cobalt chloride, nickel chloride, copper chloride, zinc chloride, gallium chloride, germanium chloride, arsenic chloride, selenium chloride, rubidium chloride, strontium chloride, yttrium chloride, zirconium chloride, niobium chloride, molybdenum chloride, ruthenium chloride, rhodium chloride, palladium chloride, silver chloride, cadmium chloride, indium chloride, tin chloride, antimony chloride, tellurium chloride, cesium chloride, barium chloride, lanthanum chloride, hafnium chloride, tantalum chloride, tungsten chloride, rhenium chloride, osmium chloride, iridium chloride, platinum chloride, gold chloride, mercury chloride, thallium chloride, lead chloride, bismuth chloride, cerium chloride, praseodymium chloride, neodymium chloride, samarium chloride, europium chloride, gadolinium chloride, terbium chloride, dysprosium chloride, holmium chloride, erbium chloride, thulium chloride, ytterbium chloride, lutetium chloride, calcium chloride, lithium bromide, beryllium bromide, sodium bromide, magnesium bromide, aluminum bromide, potassium bromide, calcium bromide, scandium bromide, titanium bromide, vanadium bromide, chromium bromide, manganese bromide, iron bromide, cobalt bromide, nickel bromide, copper bromide, zinc bromide, gallium bromide, germanium bromide, arsenic bromide, selenium bromide, rubidium bromide, strontium bromide, yttrium bromide, zirconium bromide, niobium bromide, molybdenum bromide, ruthenium bromide, rhodium bromide, palladium bromide, silver bromide, cadmium bromide, indium bromide, tin bromide, antimony bromide, tellurium bromide, cesium bromide, barium bromide, lanthanum bromide, hafnium bromide, tantalum bromide, tungsten bromide, rhenium bromide, osmium bromide, iridium bromide, platinum bromide, gold bromide, mercury bromide, thallium bromide, lead bromide, bismuth bromide, cerium bromide, praseodymium bromide, neodymium bromide, samarium bromide, europium bromide, gadolinium bromide, terbium bromide, dysprosium bromide, holmium bromide, erbium bromide, thulium bromide, ytterbium bromide, lutetium bromide, lithium iodide, beryllium iodide, sodium iodide, magnesium iodide, aluminum iodide, potassium iodide, calcium iodide, scandium iodide, titanium iodide, vanadium iodide, chromium iodide, manganese iodide, iron iodide, cobalt iodide, nickel iodide, copper iodide, zinc iodide, gallium iodide, germanium iodide, arsenic iodide, selenium iodide, rubidium iodide, strontium iodide, yttrium iodide, zirconium iodide, niobium iodide, molybdenum iodide, ruthenium iodide, rhodium iodide, palladium iodide, silver iodide, cadmium iodide, indium iodide, tin iodide, antimony iodide, tellurium iodide, cesium iodide, barium iodide, lanthanum iodide, hafnium iodide, tantalum iodide, tungsten iodide, rhenium iodide, osmium iodide, iridium iodide, platinum iodide, gold iodide, mercury iodide, thallium iodide, lead iodide, bismuth iodide, cerium iodide, praseodymium iodide, neodymium iodide, samarium iodide, europium iodide, gadolinium iodide, terbium iodide, dysprosium iodide, holmium iodide, erbium iodide, thulium iodide, ytterbium iodide, and lutetium iodide. These may be used alone or in combination. Among them, nickel chloride, holmium chloride, strontium chloride, cobalt chloride, gadolinium chloride, ytterbium chloride, cadmium chloride, nickel fluoride, nickel bromide, indium chloride, cesium chloride, rubidium chloride, chromium chloride, calcium chloride, lanthanum chloride, lithium chloride, potassium chloride, barium chloride, cerium chloride, iron chloride, and sodium chloride are preferable.

—Metal Nitrate—

In the present invention, the metal nitrate refers to a compound in which an element of the Group 1 to the Group 16 is bound to a nitrate ion. Examples of the metal nitrate include lithium nitrate, beryllium nitrate, sodium nitrate, magnesium nitrate, aluminum nitrate, potassium nitrate, calcium nitrate, scandium nitrate, titanium nitrate, vanadium nitrate, chromium nitrate, manganese nitrate, iron nitrate, cobalt nitrate, nickel nitrate, copper nitrate, zinc nitrate, gallium nitrate, germanium nitrate, arsenic nitrate, selenium nitrate, rubidium nitrate, strontium nitrate, yttrium nitrate, zirconium nitrate, niobium nitrate, molybdenum nitrate, ruthenium nitrate, rhodium nitrate, palladium nitrate, silver nitrate, cadmium nitrate, indium nitrate, tin nitrate, antimony nitrate, tellurium nitrate, cesium nitrate, barium nitrate, lanthanum nitrate, hafnium nitrate, tantalum nitrate, tungsten nitrate, rhenium nitrate, osmium nitrate, iridium nitrate, platinum nitrate, gold nitrate, mercury nitrate, thallium nitrate, lead nitrate, bismuth nitrate, cerium nitrate, praseodymium nitrate, neodymium nitrate, promethium nitrate, samarium nitrate, europium nitrate, gadolinium nitrate, terbium nitrate, dysprosium nitrate, holmium nitrate, erbium nitrate, thulium nitrate, ytterbium nitrate, and lutetium nitrate. These may be used alone or in combination.

—Metal Nitrite—

In the present invention, the metal nitrite refers to a compound in which an element of the Group 1 to the Group 16 is bound to a nitrite ion. Examples of the metal nitrite include lithium nitrite, beryllium nitrite, sodium nitrite, magnesium nitrite, aluminum nitrite, potassium nitrite, calcium nitrite, scandium nitrite, titanium nitrite, vanadium nitrite, chromium nitrite, manganese nitrite, iron nitrite, cobalt nitrite, nickel nitrite, copper nitrite, zinc nitrite, gallium nitrite, germanium nitrite, arsenic nitrite, selenium nitrite, rubidium nitrite, strontium nitrite, yttrium nitrite, zirconium nitrite, niobium nitrite, molybdenum nitrite, ruthenium nitrite, rhodium nitrite, palladium nitrite, silver nitrite, cadmium nitrite, indium nitrite, tin nitrite, antimony nitrite, tellurium nitrite, cesium nitrite, barium nitrite, lanthanum nitrite, hafnium nitrite, tantalum nitrite, tungsten nitrite, rhenium nitrite, osmium nitrite, iridium nitrite, platinum nitrite, gold nitrite, mercury nitrite, thallium nitrite, lead nitrite, bismuth nitrite, cerium nitrite, praseodymium nitrite, neodymium nitrite, promethium nitrite, samarium nitrite, europium nitrite, gadolinium nitrite, terbium nitrite, dysprosium nitrite, holmium nitrite, erbium nitrite, thulium nitrite, ytterbium nitrite, and lutetium nitrite. These may be used alone or in combination.

—Metal Sulfate—

In the present invention, the metal sulfate refers to a compound in which an element of the Group 1 to the Group 16 is bound to a sulfate ion. Examples of the metal sulfate include lithium sulfate, beryllium sulfate, sodium sulfate, magnesium sulfate, aluminum sulfate, potassium sulfate, calcium sulfate, scandium sulfate, titanium sulfate, vanadium sulfate, chromium sulfate, manganese sulfate, iron sulfate, cobalt sulfate, nickel sulfate, copper sulfate, zinc sulfate, gallium sulfate, germanium sulfate, arsenic sulfate, selenium sulfate, rubidium sulfate, strontium sulfate, yttrium sulfate, zirconium sulfate, niobium sulfate, molybdenum sulfate, ruthenium sulfate, rhodium sulfate, palladium sulfate, silver sulfate, cadmium sulfate, indium sulfate, tin sulfate, antimony sulfate, tellurium sulfate, cesium sulfate, barium sulfate, lanthanum sulfate, hafnium sulfate, tantalum sulfate, tungsten sulfate, rhenium sulfate, osmium sulfate, iridium sulfate, platinum sulfate, gold sulfate, mercury sulfate, thallium sulfate, lead sulfate, bismuth sulfate, cerium sulfate, praseodymium sulfate, neodymium sulfate, promethium sulfate, samarium sulfate, europium sulfate, gadolinium sulfate, terbium sulfate, dysprosium sulfate, holmium sulfate, erbium sulfate, thulium sulfate, ytterbium sulfate, and lutetium sulfate. These may be used alone or in combination.

—Metal Sulfite—

In the present invention, the metal sulfite refers to a compound in which an element of the Group 1 to the Group 16 is bound to a sulfite ion. Examples of the metal sulfite include lithium sulfite, beryllium sulfite, sodium sulfite, magnesium sulfite, aluminum sulfite, potassium sulfite, calcium sulfite, scandium sulfite, titanium sulfite, vanadium sulfite, chromium sulfite, manganese sulfite, iron sulfite, cobalt sulfite, nickel sulfite, copper sulfite, zinc sulfite, gallium sulfite, germanium sulfite, arsenic sulfite, selenium sulfite, rubidium sulfite, strontium sulfite, yttrium sulfite, zirconium sulfite, niobium sulfite, molybdenum sulfite, ruthenium sulfite, rhodium sulfite, palladium sulfite, silver sulfite, cadmium sulfite, indium sulfite, tin sulfite, antimony sulfite, tellurium sulfite, cesium sulfite, barium sulfite, lanthanum sulfite, hafnium sulfite, tantalum sulfite, tungsten sulfite, rhenium sulfite, osmium sulfite, iridium sulfite, platinum sulfite, gold sulfite, mercury sulfite, thallium sulfite, lead sulfite, bismuth sulfite, cerium sulfite, praseodymium sulfite, neodymium sulfite, promethium sulfite, samarium sulfite, europium sulfite, gadolinium sulfite, terbium sulfite, dysprosium sulfite, holmium sulfite, erbium sulfite, thulium sulfite, ytterbium sulfite, and lutetium sulfite. These may be used alone or in combination.

—Metal Oxide—

In the present invention, the metal oxide refers to a compound in which a metal element of the Group 1 to the Group 16 is bound to oxygen. Examples of the metal oxide include silver(I) oxide, boron oxide, barium oxide, bismuth trioxide, calcium oxide, cadmium oxide, cerium oxide, cobalt oxide, cobalt monoxide, cobalt oxyhydroxide, tricobalt tetroxide, chromium oxide, chromium trioxide, cuprous oxide, cupric oxide, dysprosium oxide, erbium oxide, europium oxide, ferrous oxide, ferric oxide, tri-iron tetroxide, gallium oxide, gadolinium oxide, germanium dioxide, hafnium oxide, mercuric oxide, holmium oxide, indium oxide, lanthanum oxide, lithium oxide, lutetium oxide, magnesium oxide, manganese monoxide, manganese dioxide, dimanganese trioxide, trimanganese tetroxide, molybdenum dioxide, molybdenum trioxide, niobium monoxide, niobium dioxide, niobium trioxide, niobium pentoxide, neodymium oxide, nickel oxide, nickel monoxide, lead monoxide, lead dioxide, trilead tetroxide, palladium oxide, praseodymium oxide, platinum dioxide, platinum oxide, rhenium oxide, ruthenium oxide, antimony trioxide, antimony tetraoxide, antimony pentoxide, scandium oxide, silicon monoxide, silicon dioxide, samarium oxide, stannous oxide, stannic oxide, strontium oxide, tantalum pentoxide, terbium oxide, tellurium dioxide, tellurium trioxide, titanium monoxide, titanium dioxide, dititanium trioxide, thallous oxide, thallic oxide, thulium oxide, divanadium trioxide, vanadium dioxide, vanadium pentoxide, divanadium tetroxide, tungsten dioxide, tungsten trioxide, yttrium oxide, ytterbium oxide, zinc oxide, zinc oxide-alumina, zirconium oxide, silicon monoxide, silicon dioxide, quartz, glass, siliceous sand, and siliceous stone. These may be used alone or in combination. Among them, nickel oxide, strontium oxide, indium oxide, cobalt oxide, and palladium oxide are preferable.

—Complex Metal Oxide—

In the present invention, the complex metal oxide refers to an oxide formed of oxygen and two or more kinds of metal elements among the metal elements of the Group 1 to the Group 16. In the complex metal oxide, examples of the complex oxides formed of two kinds of metals include a complex oxide of a Group 1 element and a Group 1 element, a complex oxide of a Group 1 element and a Group 2 element, a complex oxide of a Group 1 element and a Group 3 element, a complex oxide of a Group 1 element and a Group 4 element, a complex oxide of a Group 1 element and a Group 5 element, a complex oxide of a Group 1 element and a Group 6 element, a complex oxide of a Group 1 element and a Group 7 element, a complex oxide of a Group 1 element and a Group 8 element, a complex oxide of a Group 1 element and a Group 9 element, a complex oxide of a Group 1 element and a Group 10 element, a complex oxide of a Group 1 element and a Group 11 element, a complex oxide of a Group 1 element and a Group 12 element, a complex oxide of a Group 1 element and a Group 13 element, a complex oxide of a Group 1 element and a Group 14 element, a complex oxide of a Group 1 element and a Group 15 element, a complex oxide of a Group 1 element and a Group 16 element, a complex oxide of a Group 2 element and a Group 2 element, a complex oxide of a Group 2 element and a Group 3 element, a complex oxide of a Group 2 element and a Group 4 element, a complex oxide of a Group 2 element and a Group 5 element, a complex oxide of a Group 2 element and a Group 6 element, a complex oxide of a Group 2 element and a Group 7 element, a complex oxide of a Group 2 element and a Group 8 element, a complex oxide of a Group 2 element and a Group 9 element, a complex oxide of a Group 2 element and a Group 10 element, a complex oxide of a Group 2 element and a Group 11 element, a complex oxide of a Group 2 element and a Group 12 element, a complex oxide of a Group 2 element and a Group 13 element, a complex oxide of a Group 2 element and a Group 14 element, a complex oxide of a Group 2 element and a Group 15 element, a complex oxide of a Group 2 element and a Group 16 element, a complex oxide of a Group 3 element and a Group 3 element, a complex oxide of a Group 3 element and a Group 4 element, a complex oxide of a Group 3 element and a Group 5 element, a complex oxide of a Group 3 element and a Group 6 element, a complex oxide of a Group 3 element and a Group 7 element, a complex oxide of a Group 3 element and a Group 8 element, a complex oxide of a Group 3 element and a Group 9 element, a complex oxide of a Group 3 element and a Group 10 element, a complex oxide of a Group 3 element and a Group 11 element, a complex oxide of a Group 3 element and a Group 12 element, a complex oxide of a Group 3 element and a Group 13 element, a complex oxide of a Group 3 element and a Group 14 element, a complex oxide of a Group 3 element and a Group 15 element, a complex oxide of a Group 3 element and a Group 16 element, a complex oxide of a Group 4 element and a Group 4 element, a complex oxide of a Group 4 element and a Group 5 element, a complex oxide of a Group 4 element and a Group 6 element, a complex oxide of a Group 4 element and a Group 7 element, a complex oxide of a Group 4 element and a Group 8 element, a complex oxide of a Group 4 element and a Group 9 element, a complex oxide of a Group 4 element and a Group 10 element, a complex oxide of a Group 4 element and a Group 11 element, a complex oxide of a Group 4 element and a Group 12 element, a complex oxide of a Group 4 element and a Group 13 element, a complex oxide of a Group 4 element and a Group 14 element, a complex oxide of a Group 4 element and a Group 15 element, a complex oxide of a Group 4 element and a Group 16 element, a complex oxide of a Group 5 element and a Group 5 element, a complex oxide of a Group 5 element and a Group 6 element, a complex oxide of a Group 5 element and a Group 7 element, a complex oxide of a Group 5 element and a Group 8 element, a complex oxide of a Group 5 element and a Group 9 element, a complex oxide of a Group 5 element and a Group 10 element, a complex oxide of a Group 5 element and a Group 11 element, a complex oxide of a Group 5 element and a Group 12 element, a complex oxide of a Group 5 element and a Group 13 element, a complex oxide of a Group 5 element and a Group 14 element, a complex oxide of a Group 5 element and a Group 15 element, a complex oxide of a Group 5 element and a Group 16 element, a complex oxide of a Group 6 element and a Group 6 element, a complex oxide of a Group 6 element and a Group 7 element, a complex oxide of a Group 6 element and a Group 8 element, a complex oxide of a Group 6 element and a Group 9 element, a complex oxide of a Group 6 element and a Group 10 element, a complex oxide of a Group 6 element and a Group 11 element, a complex oxide of a Group 6 element and a Group 12 element, a complex oxide of a Group 6 element and a Group 13 element, a complex oxide of a Group 6 element and a Group 14 element, a complex oxide of a Group 6 element and a Group 15 element, a complex oxide of a Group 6 element and a Group 16 element, a complex oxide of a Group 7 element and a Group 7 element, a complex oxide of a Group 7 element and a Group 8 element, a complex oxide of a Group 7 element and a Group 9 element, a complex oxide of a Group 7 element and a Group 10 element, a complex oxide of a Group 7 element and a Group 11 element, a complex oxide of a Group 7 element and a Group 12 element, a complex oxide of a Group 7 element and a Group 13 element, a complex oxide of a Group 7 element and a Group 14 element, a complex oxide of a Group 7 element and a Group 15 element, a complex oxide of a Group 7 element and a Group 16 element, a complex oxide of a Group 8 element and a Group 8 element, a complex oxide of a Group 8 element and a Group 9 element, a complex oxide of a Group 8 element and a Group 10 element, a complex oxide of a Group 8 element and a Group 11 element, a complex oxide of a Group 8 element and a Group 12 element, a complex oxide of a Group 8 element and a Group 13 element, a complex oxide of a Group 8 element and a Group 14 element, a complex oxide of a Group 8 element and a Group 15 element, a complex oxide of a Group 8 element and a Group 16 element, a complex oxide of a Group 9 element and a Group 9 element, a complex oxide of a Group 9 element and a Group 10 element, a complex oxide of a Group 9 element and a Group 11 element, a complex oxide of a Group 9 element and a Group 12 element, a complex oxide of a Group 9 element and a Group 13 element, a complex oxide of a Group 9 element and a Group 14 element, a complex oxide of a Group 9 element and a Group 15 element, a complex oxide of a Group 9 element and a Group 16 element, a complex oxide of a Group 10 element and a Group 10 element, a complex oxide of a Group 10 element and a Group 11 element, a complex oxide of a Group 10 element and a Group 12 element, a complex oxide of a Group 10 element and a Group 13 element, a complex oxide of a Group 10 element and a Group 14 element, a complex oxide of a Group 10 element and a Group 15 element, a complex oxide of a Group 10 element and a Group 16 element, a complex oxide of a Group 11 element and a Group 11 element, a complex oxide of a Group 11 element and a Group 12 element, a complex oxide of a Group 11 element and a Group 13 element, a complex oxide of a Group 11 element and a Group 14 element, a complex oxide of a Group 11 element and a Group 15 element, a complex oxide of a Group 11 element and a Group 16 element, a complex oxide of a Group 12 element and a Group 12 element, a complex oxide of a Group 12 element and a Group 13 element, a complex oxide of a Group 12 element and a Group 14 element, a complex oxide of a Group 12 element and a Group 15 element, a complex oxide of a Group 12 element and a Group 16 element, a complex oxide of a Group 13 element and a Group 13 element, a complex oxide of a Group 13 element and a Group 14 element, a complex oxide of a Group 13 element and a Group 15 element, a complex oxide of a Group 13 element and a Group 16 element, a complex oxide of a Group 14 element and a Group 14 element, a complex oxide of a Group 14 element and a Group 15 element, a complex oxide of a Group 14 element and a Group 16 element, a complex oxide of a Group 15 element and a Group 15 element, a complex oxide of a Group 15 element and a Group 16 element, and a complex oxide of a Group 16 element and a Group 16 element. These may be used alone or in combination. Among them, a complex oxide of a Group 2 element and a Group 8 element, a complex oxide of a Group 6 element and a Group 7 element, a complex oxide of a Group 7 element and a Group 8 element, a complex oxide of a Group 8 element and a Group 9 element, a complex oxide of a Group 8 element and a Group 10 element, a complex oxide of a Group 8 element and a Group 11 element, a complex oxide of a Group 13 element and a Group 14 element, and a complex oxide of a Group 14 element and a Group 15 element are preferable. Examples thereof include cobalt iron oxide, copper iron oxide, indium tin oxide, magnesium iron oxide, manganese-chromium oxide, manganese.iron oxide, and nickel.iron oxide.

Examples of the complex metal oxide formed of three or more kinds of metals include complex metal oxides combining 3 to 65 kinds of simple metals listed below; i.e., three or more kinds of the following: lithium, beryllium, sodium, magnesium, aluminum, potassium, calcium, scandium, titanium, vanadium, chromium, manganese, iron, cobalt, nickel, copper, zinc, gallium, germanium, arsenic, selenium, rubidium, strontium, yttrium, zirconium, niobium, molybdenum, ruthenium, rhodium, palladium, silver, cadmium, indium, tin, antimony, tellurium, cesium, barium, lanthanum, hafnium, tantalum, tungsten, rhenium, osmium, iridium, platinum, gold, mercury, thallium, lead, bismuth, cerium, praseodymium, neodymium, promethium, samarium, europium, gadolinium, terbium, dysprosium, holmium, erbium, thulium, ytterbium, and lutetium. These may be used alone or in combination. More specific examples thereof include lead.lanthanum.zirconium.titanium oxide, lead.zirconium.titanium oxide, tin.antimony oxide, and strontium titanate.niobium pentoxide.

—Metal Peroxide—

In the present invention, the metal peroxide refers to a peroxide formed of oxygen and two or more kinds of metal elements selected from the metal elements of the Group 1 to the Group 16. Examples of the metal peroxide include lithium peroxide, beryllium peroxide, sodium peroxide, magnesium peroxide, aluminum peroxide, potassium peroxide, calcium peroxide, scandium peroxide, titanium peroxide, vanadium peroxide, chromium peroxide, manganese peroxide, iron peroxide, cobalt peroxide, nickel peroxide, copper peroxide, zinc peroxide, gallium peroxide, germanium peroxide, arsenic peroxide, selenium peroxide, rubidium peroxide, strontium peroxide, yttrium peroxide, zirconium peroxide, niobium peroxide, molybdenum peroxide, ruthenium peroxide, rhodium peroxide, palladium peroxide, silver peroxide, cadmium peroxide, indium peroxide, tin peroxide, antimony peroxide, tellurium peroxide, cesium peroxide, barium peroxide, lanthanum peroxide, hafnium peroxide, tantalum peroxide, tungsten peroxide, rhenium peroxide, osmium peroxide, iridium peroxide, platinum peroxide, gold peroxide, mercury peroxide, thallium peroxide, lead peroxide, bismuth peroxide, cerium peroxide, praseodymium peroxide, neodymium peroxide, promethium peroxide, samarium peroxide, europium peroxide, gadolinium peroxide, terbium peroxide, dysprosium peroxide, holmium peroxide, erbium peroxide, thulium peroxide, ytterbium peroxide, lutetium peroxide, silver peroxide, and barium peroxide. These may be used alone or in combination.

—Metal Halide Complex—

In the present invention, the metal halide complex refers to a compound containing a metal ion at the center of a molecule and a halide ion as a ligand. Examples of the metal halide complex include calcium hexafluorosilicate(IV), ammonium hexafluorozirconate(IV), potassium hexafluorozirconate(IV), potassium heptafluorotantalate(V), ammonium hexafluorotitanate(IV), potassium hexafluorotitanate(IV), ammonium tetrafluoroberyllate(II), potassium tetrafluoroberyllate(II), lithium tetrafluoroborate(III), potassium aquapentachlororhodate(III), pentaamminechloroiridium(III) chloride, cis-tetraamminedichlorocobalt(III) chloride, pentaamminechlorocobalt(III) chloride, diamminedichloropalladium(II), pentaamminechlororhodium(III) chloride, trans-diamminedichloroplatinum(II), cis-diamminedichloroplatinum(II), potassium tetrachlorozincate(II), lithium tetrachloroaluminate(III), ammonium hexachloroiridate(III), potassium hexachloroiridate(III), sodium hexachloroiridate(III), ammonium hexachloroiridate(IV), potassium hexachloroiridate(IV), sodium hexachloroiridate(IV), potassium hexachloroindate(III), ammonium hexachloroosmate(IV), potassium hexachloroosmate(IV), sodium hexachloroosmate(IV), ammonium tetrachlorogalliumate(III), potassium tetrachloroaurate(III), sodium tetrachloroaurate(III), lithium tetrachloroaurate(III), ammonium tetrachloromercurate(II), ammonium hexachlorostannate(IV), potassium hexachlorostannate(IV), potassium hexachlorotitanate(IV), potassium dichlorotetranitroiridate(III), potassium pentachloronitrosylruthenate(III), ammonium tetrachloroplatinate(II), potassium tetrachloroplatinate(II), sodium tetrachloroplatinate(II), ammonium hexachloroplatinate(IV), potassium hexachloroplatinate(IV), sodium hexachloroplatinate(IV), ammonium tetrachloropalladate(II), potassium tetrachloropalladate(II), sodium tetrachloropalladate(II), lithium tetrachloropalladate(II), potassium hexachloropalladate(IV), ammonium hexachlororuthenate(III), ammonium pentachlororuthenate(III), potassium hexachlororuthenate(IV), sodium hexachlororuthenate(IV), potassium hexachlororhenate(III), potassium hexachlororhenate(IV), ammonium hexachlororhodate(III), potassium hexachlororhodate(III), sodium hexachlororhodate(III), potassium hexabromoiridate(III), potassium hexabromoiridate(IV), potassium hexabromoosmate(III), potassium tetrabromoaurate(III), sodium tetrabromoaurate(III), potassium hexabromoplatinate(IV), potassium tetrabromopalladate(II), potassium hexabromopalladate(IV), potassium hexabromoruthenate(III), potassium hexabromoruthenate(IV), potassium hexaiodoiridate(III), rubidium triiodoargentate(I), potassium tetraiodomercurate(II), sodium tetraiodomercurate(II), potassium hexaiodoplatinate(IV), and potassium hexaiodoruthenate(III). These may be used alone or in combination.

—Zeolite—

In the present invention, the zeolite refers to a kind of clay mineral and a silicate of hydrous aluminum having an anionic skeleton with pores in the crystal structure and containing an alkali or alkaline earth metal. Examples of the zeolite include Type A, ferrierite, MCM-22, ZSM-5, mordenite, Type L, Type Y, Type X, and Type β. These may be used alone or in combination.

—Metal Boride—

Examples of the metal boride include lithium boride, beryllium boride, sodium boride, magnesium boride, aluminum boride, potassium boride, calcium boride, scandium boride, titanium boride, vanadium boride, chromium boride, manganese boride, iron boride, cobalt boride, nickel boride, copper boride, zinc boride, gallium boride, germanium boride, arsenic boride, selenium boride, rubidium boride, strontium boride, yttrium boride, zirconium boride, niobium boride, molybdenum boride, ruthenium boride, rhodium boride, palladium boride, silver boride, cadmium boride, indium boride, tin boride, antimony boride, tellurium boride, cesium boride, barium boride, lanthanum boride, hafnium boride, tantalum boride, tungsten boride, rhenium boride, osmium boride, iridium boride, platinum boride, gold boride, mercury boride, thallium boride, lead boride, bismuth boride, cerium boride, praseodymium boride, neodymium boride, promethium boride, samarium boride, europium boride, gadolinium boride, terbium boride, dysprosium boride, holmium boride, erbium boride, thulium boride, ytterbium boride, lutetium boride, and silicon boride. These may be used alone or in combination. Among them, zirconium boride, titanium boride, nickel boride, lanthanum boride, aluminum boride, and tantalum boride are preferable.

—Metal Silicide—

Examples of the metal silicide include lithium silicide, beryllium silicide, sodium silicide, magnesium silicide, aluminum silicide, potassium silicide, calcium silicide, scandium silicide, titanium silicide, vanadium silicide, chromium silicide, manganese silicide, iron silicide, cobalt silicide, nickel silicide, copper silicide, zinc silicide, gallium silicide, germanium silicide, arsenic silicide, selenium silicide, rubidium silicide, strontium silicide, yttrium silicide, zirconium silicide, niobium silicide, molybdenum silicide, ruthenium silicide, rhodium silicide, palladium silicide, silver silicide, cadmium silicide, indium silicide, tin silicide, antimony silicide, tellurium silicide, cesium silicide, barium silicide, lanthanum silicide, hafnium silicide, tantalum silicide, tungsten silicide, rhenium silicide, osmium silicide, iridium silicide, platinum silicide, gold silicide, mercury silicide, thallium silicide, lead silicide, bismuth silicide, cerium silicide, praseodymium silicide, neodymium silicide, promethium silicide, samarium silicide, europium silicide, gadolinium silicide, terbium silicide, dysprosium silicide, holmium silicide, erbium silicide, thulium silicide, ytterbium silicide, and lutetium silicide. These may be used alone or in combination.

—Metal Nitride—

Examples of the metal nitride include lithium nitride, beryllium nitride, sodium nitride, magnesium nitride, aluminum nitride, potassium nitride, calcium nitride, scandium nitride, titanium nitride, vanadium nitride, chromium nitride, manganese nitride, iron nitride, cobalt nitride, nickel nitride, copper nitride, zinc nitride, gallium nitride, germanium nitride, arsenic nitride, selenium nitride, rubidium nitride, strontium nitride, yttrium nitride, zirconium nitride, niobium nitride, molybdenum nitride, ruthenium nitride, rhodium nitride, palladium nitride, silver nitride, cadmium nitride, indium nitride, tin nitride, antimony nitride, tellurium nitride, cesium nitride, barium nitride, lanthanum nitride, hafnium nitride, tantalum nitride, tungsten nitride, rhenium nitride, osmium nitride, iridium nitride, platinum nitride, gold nitride, mercury nitride, thallium nitride, lead nitride, bismuth nitride, cerium nitride, praseodymium nitride, neodymium nitride, promethium nitride, samarium nitride, europium nitride, gadolinium nitride, terbium nitride, dysprosium nitride, holmium nitride, erbium nitride, thulium nitride, ytterbium nitride, lutetium nitride, and silicon nitride. These may be used alone or in combination.

—Metal Sulfide—

Examples of the metal sulfide include lithium sulfide, beryllium sulfide, sodium sulfide, magnesium sulfide, aluminum sulfide, potassium sulfide, calcium sulfide, scandium sulfide, titanium sulfide, vanadium sulfide, chromium sulfide, manganese sulfide, iron sulfide, cobalt sulfide, nickel sulfide, copper sulfide, zinc sulfide, gallium sulfide, germanium sulfide, arsenic sulfide, selenium sulfide, rubidium sulfide, strontium sulfide, yttrium sulfide, zirconium sulfide, niobium sulfide, molybdenum sulfide, ruthenium sulfide, rhodium sulfide, palladium sulfide, silver sulfide, cadmium sulfide, indium sulfide, tin sulfide, antimony sulfide, tellurium sulfide, cesium sulfide, barium sulfide, lanthanum sulfide, hafnium sulfide, tantalum sulfide, tungsten sulfide, rhenium sulfide, osmium sulfide, iridium sulfide, platinum sulfide, gold sulfide, mercury sulfide, thallium sulfide, lead sulfide, bismuth sulfide, cerium sulfide, praseodymium sulfide, neodymium sulfide, promethium sulfide, samarium sulfide, europium sulfide, gadolinium sulfide, terbium sulfide, dysprosium sulfide, holmium sulfide, erbium sulfide, thulium sulfide, ytterbium sulfide, and lutetium sulfide. These may be used alone or in combination.

—Metal Phosphide—

Examples of the metal phosphide include lithium phosphide, beryllium phosphide, sodium phosphide, magnesium phosphide, aluminum phosphide, potassium phosphide, calcium phosphide, scandium phosphide, titanium phosphide, vanadium phosphide, chromium phosphide, manganese phosphide, iron phosphide, cobalt phosphide, nickel phosphide, copper phosphide, zinc phosphide, gallium phosphide, germanium phosphide, arsenic phosphide, selenium phosphide, rubidium phosphide, strontium phosphide, yttrium phosphide, zirconium phosphide, niobium phosphide, molybdenum phosphide, ruthenium phosphide, rhodium phosphide, palladium phosphide, silver phosphide, cadmium phosphide, indium phosphide, tin phosphide, cesium phosphide, barium phosphide, lanthanum phosphide, hafnium phosphide, tantalum phosphide, tungsten phosphide, rhenium phosphide, osmium phosphide, iridium phosphide, platinum phosphide, gold phosphide, thallium phosphide, cerium phosphide, praseodymium phosphide, neodymium phosphide, promethium phosphide, samarium phosphide, europium phosphide, gadolinium phosphide, terbium phosphide, dysprosium phosphide, holmium phosphide, erbium phosphide, thulium phosphide, ytterbium phosphide, lutetium phosphide, cobalt phosphide, copper phosphide, iron phosphide, gallium phosphide, indium phosphide, dimanganese phosphide, dinickel phosphide, trinickel phosphide, trizinc phosphide, and silicon phosphide. These may be used alone or in combination.

—Metal Antimonide—

Examples of the metal antimonide include aluminum antimonide, bismuth antimonide, iron antimonide, indium antimonide, manganese antimonide, tetrazinc triantimonide, and zinc antimonide. These may be used alone or in combination.

—Metal Selenide—

Examples of the metal selenide include lithium selenide, beryllium selenide, sodium selenide, magnesium selenide, aluminum selenide, potassium selenide, calcium selenide, scandium selenide, titanium selenide, vanadium selenide, chromium selenide, manganese selenide, iron selenide, cobalt selenide, nickel selenide, copper selenide, zinc selenide, gallium selenide, germanium selenide, arsenic selenide, rubidium selenide, strontium selenide, yttrium selenide, zirconium selenide, niobium selenide, molybdenum selenide, ruthenium selenide, rhodium selenide, palladium selenide, silver selenide, cadmium selenide, indium selenide, tin selenide, antimony selenide, tellurium selenide, cesium selenide, barium selenide, lanthanum selenide, hafnium selenide, tantalum selenide, tungsten selenide, rhenium selenide, osmium selenide, iridium selenide, platinum selenide, gold selenide, mercury selenide, thallium selenide, lead selenide, bismuth selenide, cerium selenide, praseodymium selenide, neodymium selenide, promethium selenide, samarium selenide, europium selenide, gadolinium selenide, terbium selenide, dysprosium selenide, holmium selenide, erbium selenide, thulium selenide, ytterbium selenide, lutetium selenide, and silicon selenide. These may be used alone or in combination.

—Metal Carbide—

Examples of the metal carbide include lithium carbide, beryllium carbide, sodium carbide, magnesium carbide, aluminum carbide, potassium carbide, calcium carbide, scandium carbide, titanium carbide, vanadium carbide, chromium carbide, manganese carbide, iron carbide, cobalt carbide, nickel carbide, copper carbide, zinc carbide, gallium carbide, germanium carbide, arsenic carbide, selenium carbide, rubidium carbide, strontium carbide, yttrium carbide, zirconium carbide, niobium carbide, molybdenum carbide, ruthenium carbide, rhodium carbide, palladium carbide, silver carbide, cadmium carbide, indium carbide, tin carbide, antimony carbide, tellurium carbide, cesium carbide, barium carbide, lanthanum carbide, hafnium carbide, tantalum carbide, tungsten carbide, rhenium carbide, osmium carbide, iridium carbide, platinum carbide, gold carbide, mercury carbide, thallium carbide, lead carbide, bismuth carbide, cerium carbide, praseodymium carbide, neodymium carbide, promethium carbide, samarium carbide, europium carbide, gadolinium carbide, terbium carbide, dysprosium carbide, holmium carbide, erbium carbide, thulium carbide, ytterbium carbide, lutetium carbide, and silicon carbide. These may be used alone or in combination. Among them, titanium carbide, zirconium carbide, niobium carbide, tantalum carbide, chromium carbide, and silicon carbide are preferable.

—Metal Chlorate—

Examples of the metal chlorate include sodium chlorate, potassium chlorate, calcium chlorate, barium chlorate, zinc chlorate, and silver chlorate. These may be used alone or in combination.

—Metal Perchlorate—

Examples of the metal perchlorate include potassium perchlorate, barium perchlorate, magnesium perchlorate, and lithium perchlorate. These may be used alone or in combination.

—Metal Bromate—

Examples of the metal bromate include potassium bromate, sodium bromate, and aluminum bromate. These may be used alone or in combination.

—Metal Perbromate—

Examples of the metal perbromate include sodium perbromate, potassium perbromate, and calcium perbromate. These may be used alone or in combination.

—Metal Iodate—

Examples of the metal iodate include sodium iodate, silver iodate, and calcium iodate. These may be used alone or in combination.

—Metal Periodate—

Examples of the metal periodate include sodium periodate, potassium periodate, rubidium periodate, and cesium periodate. These may be used alone or in combination.

—Metal Oxalate—

Examples of the metal oxalate include lithium oxalate, beryllium oxalate, sodium oxalate, magnesium oxalate, aluminum oxalate, potassium oxalate, calcium oxalate, scandium oxalate, titanium oxalate, vanadium oxalate, chromium oxalate, manganese oxalate, iron oxalate, cobalt oxalate, nickel oxalate, copper oxalate, zinc oxalate, gallium oxalate, germanium oxalate, arsenic oxalate, selenium oxalate, rubidium oxalate, strontium oxalate, yttrium oxalate, zirconium oxalate, niobium oxalate, molybdenum oxalate, ruthenium oxalate, rhodium oxalate, palladium oxalate, silver oxalate, cadmium oxalate, indium oxalate, tin oxalate, antimony oxalate, tellurium oxalate, cesium oxalate, barium oxalate, lanthanum oxalate, hafnium oxalate, tantalum oxalate, tungsten oxalate, rhenium oxalate, osmium oxalate, iridium oxalate, platinum oxalate, gold oxalate, mercury oxalate, thallium oxalate, lead oxalate, bismuth oxalate, cerium oxalate, praseodymium oxalate, neodymium oxalate, promethium oxalate, samarium oxalate, europium oxalate, gadolinium oxalate, terbium oxalate, dysprosium oxalate, holmium oxalate, erbium oxalate, thulium oxalate, ytterbium oxalate, and lutetium oxalate. These may be used alone or in combination.

—Metal Carbonate—

Examples of the metal carbonate include lithium carbonate, beryllium carbonate, sodium carbonate, magnesium carbonate, aluminum carbonate, potassium carbonate, calcium carbonate, scandium carbonate, titanium carbonate, vanadium carbonate, chromium carbonate, manganese carbonate, iron carbonate, cobalt carbonate, nickel carbonate, copper carbonate, zinc carbonate, gallium carbonate, germanium carbonate, arsenic carbonate, selenium carbonate, rubidium carbonate, strontium carbonate, yttrium carbonate, zirconium carbonate, niobium carbonate, molybdenum carbonate, ruthenium carbonate, rhodium carbonate, palladium carbonate, silver carbonate, cadmium carbonate, indium carbonate, tin carbonate, antimony carbonate, tellurium carbonate, cesium carbonate, barium carbonate, lanthanum carbonate, hafnium carbonate, tantalum carbonate, tungsten carbonate, rhenium carbonate, osmium carbonate, iridium carbonate, platinum carbonate, gold carbonate, mercury carbonate, thallium carbonate, lead carbonate, bismuth carbonate, cerium carbonate, praseodymium carbonate, neodymium carbonate, promethium carbonate, samarium carbonate, europium carbonate, gadolinium carbonate, terbium carbonate, dysprosium carbonate, holmium carbonate, erbium carbonate, thulium carbonate, ytterbium carbonate, and lutetium carbonate. These may be used alone or in combination.

—Metal Phosphate—

Examples of the metal phosphate include lithium orthophosphate, beryllium orthophosphate, sodium orthophosphate, magnesium orthophosphate, aluminum orthophosphate, potassium orthophosphate, calcium orthophosphate, scandium orthophosphate, titanium orthophosphate, vanadium orthophosphate, chromium orthophosphate, manganese orthophosphate, iron orthophosphate, cobalt orthophosphate, nickel orthophosphate, copper orthophosphate, zinc orthophosphate, gallium orthophosphate, germanium orthophosphate, arsenic orthophosphate, selenium orthophosphate, rubidium orthophosphate, strontium orthophosphate, yttrium orthophosphate, zirconium orthophosphate, niobium orthophosphate, molybdenum orthophosphate, ruthenium orthophosphate, rhodium orthophosphate, palladium orthophosphate, silver orthophosphate, cadmium orthophosphate, indium orthophosphate, tin orthophosphate, antimony orthophosphate, tellurium orthophosphate, cesium orthophosphate, barium orthophosphate, lanthanum orthophosphate, hafnium orthophosphate, tantalum orthophosphate, tungsten orthophosphate, rhenium orthophosphate, osmium orthophosphate, iridium orthophosphate, platinum orthophosphate, gold orthophosphate, mercury orthophosphate, thallium orthophosphate, lead orthophosphate, bismuth orthophosphate, cerium orthophosphate, praseodymium orthophosphate, neodymium orthophosphate, promethium orthophosphate, samarium orthophosphate, europium orthophosphate, gadolinium orthophosphate, terbium orthophosphate, dysprosium orthophosphate, holmium orthophosphate, erbium orthophosphate, thulium orthophosphate, ytterbium orthophosphate, lutetium orthophosphate, lithium polyphosphate, beryllium polyphosphate, sodium polyphosphate, magnesium polyphosphate, aluminum polyphosphate, potassium polyphosphate, calcium polyphosphate, scandium polyphosphate, titanium polyphosphate, vanadium polyphosphate, chromium polyphosphate, manganese polyphosphate, iron polyphosphate, cobalt polyphosphate, nickel polyphosphate, copper polyphosphate, zinc polyphosphate, gallium polyphosphate, germanium polyphosphate, arsenic polyphosphate, selenium polyphosphate, rubidium polyphosphate, strontium polyphosphate, yttrium polyphosphate, zirconium polyphosphate, niobium polyphosphate, molybdenum polyphosphate, ruthenium polyphosphate, rhodium polyphosphate, palladium polyphosphate, silver polyphosphate, cadmium polyphosphate, indium polyphosphate, tin polyphosphate, antimony polyphosphate, tellurium polyphosphate, cesium polyphosphate, barium polyphosphate, lanthanum polyphosphate, hafnium polyphosphate, tantalum polyphosphate, tungsten polyphosphate, rhenium polyphosphate, osmium polyphosphate, iridium polyphosphate, platinum polyphosphate, gold polyphosphate, mercury polyphosphate, thallium polyphosphate, lead polyphosphate, bismuth polyphosphate, cerium polyphosphate, praseodymium polyphosphate, neodymium polyphosphate, promethium polyphosphate, samarium polyphosphate, europium polyphosphate, gadolinium polyphosphate, terbium polyphosphate, dysprosium polyphosphate, holmium polyphosphate, erbium polyphosphate, thulium polyphosphate, ytterbium polyphosphate, lutetium polyphosphate, lithium metaphosphate, beryllium metaphosphate, sodium metaphosphate, magnesium metaphosphate, aluminum metaphosphate, potassium metaphosphate, calcium metaphosphate, scandium metaphosphate, titanium metaphosphate, vanadium metaphosphate, chromium metaphosphate, manganese metaphosphate, iron metaphosphate, cobalt metaphosphate, nickel metaphosphate, copper metaphosphate, zinc metaphosphate, gallium metaphosphate, germanium metaphosphate, arsenic metaphosphate, selenium metaphosphate, rubidium metaphosphate, strontium metaphosphate, yttrium metaphosphate, zirconium metaphosphate, niobium metaphosphate, molybdenum metaphosphate, ruthenium metaphosphate, rhodium metaphosphate, palladium metaphosphate, silver metaphosphate, cadmium metaphosphate, indium metaphosphate, tin metaphosphate, antimony metaphosphate, tellurium metaphosphate, cesium metaphosphate, barium metaphosphate, lanthanum metaphosphate, hafnium metaphosphate, tantalum metaphosphate, tungsten metaphosphate, rhenium metaphosphate, osmium metaphosphate, iridium metaphosphate, platinum metaphosphate, gold metaphosphate, mercury metaphosphate, thallium metaphosphate, lead metaphosphate, bismuth metaphosphate, cerium metaphosphate, praseodymium metaphosphate, neodymium metaphosphate, promethium metaphosphate, samarium metaphosphate, europium metaphosphate, gadolinium metaphosphate, terbium metaphosphate, dysprosium metaphosphate, holmium metaphosphate, erbium metaphosphate, thulium metaphosphate, ytterbium metaphosphate, and lutetium metaphosphate. These may be used alone or in combination.

—Metal Phosphite—

Examples of the metal phosphite include lithium phosphite, beryllium phosphite, sodium phosphite, magnesium phosphite, aluminum phosphite, potassium phosphite, calcium phosphite, scandium phosphite, titanium phosphite, vanadium phosphite, chromium phosphite, manganese phosphite, iron phosphite, cobalt phosphite, nickel phosphite, copper phosphite, zinc phosphite, gallium phosphite, germanium phosphite, arsenic phosphite, selenium phosphite, rubidium phosphite, strontium phosphite, yttrium phosphite, zirconium phosphite, niobium phosphite, molybdenum phosphite, ruthenium phosphite, rhodium phosphite, palladium phosphite, silver phosphite, cadmium phosphite, indium phosphite, tin phosphite, antimony phosphite, tellurium phosphite, cesium phosphite, barium phosphite, lanthanum phosphite, hafnium phosphite, tantalum phosphite, tungsten phosphite, rhenium phosphite, osmium phosphite, iridium phosphite, platinum phosphite, gold phosphite, mercury phosphite, thallium phosphite, lead phosphite, bismuth phosphite, cerium phosphite, praseodymium phosphite, neodymium phosphite, promethium phosphite, samarium phosphite, europium phosphite, gadolinium phosphite, terbium phosphite, dysprosium phosphite, holmium phosphite, erbium phosphite, thulium phosphite, ytterbium phosphite, and lutetium phosphite. These may be used alone or in combination.

—Metal Hypophosphite—

Examples of the metal hypophosphite include lithium hypophosphite, beryllium hypophosphite, sodium hypophosphite, magnesium hypophosphite, aluminum hypophosphite, potassium hypophosphite, calcium hypophosphite, scandium hypophosphite, titanium hypophosphite, vanadium hypophosphite, chromium hypophosphite, manganese hypophosphite, iron hypophosphite, cobalt hypophosphite, nickel hypophosphite, copper hypophosphite, zinc hypophosphite, gallium hypophosphite, germanium hypophosphite, arsenic hypophosphite, selenium hypophosphite, rubidium hypophosphite, strontium hypophosphite, yttrium hypophosphite, zirconium hypophosphite, niobium hypophosphite, molybdenum hypophosphite, ruthenium hypophosphite, rhodium hypophosphite, palladium hypophosphite, silver hypophosphite, cadmium hypophosphite, indium hypophosphite, tin hypophosphite, antimony hypophosphite, tellurium hypophosphite, cesium hypophosphite, barium hypophosphite, lanthanum hypophosphite, hafnium hypophosphite, tantalum hypophosphite, tungsten hypophosphite, rhenium hypophosphite, osmium hypophosphite, iridium hypophosphite, platinum hypophosphite, gold hypophosphite, mercury hypophosphite, thallium hypophosphite, lead hypophosphite, bismuth hypophosphite, cerium hypophosphite, praseodymium hypophosphite, neodymium hypophosphite, promethium hypophosphite, samarium hypophosphite, europium hypophosphite, gadolinium hypophosphite, terbium hypophosphite, dysprosium hypophosphite, holmium hypophosphite, erbium hypophosphite, thulium hypophosphite, ytterbium hypophosphite, and lutetium hypophosphite. These may be used alone or in combination.

—Metal Borate—

Examples of the metal borate include lithium orthoborate, beryllium orthoborate, sodium orthoborate, magnesium orthoborate, aluminum orthoborate, potassium orthoborate, calcium orthoborate, scandium orthoborate, titanium orthoborate, vanadium orthoborate, chromium orthoborate, manganese orthoborate, iron orthoborate, cobalt orthoborate, nickel orthoborate, copper orthoborate, zinc orthoborate, gallium orthoborate, germanium orthoborate, arsenic orthoborate, selenium orthoborate, rubidium orthoborate, strontium orthoborate, yttrium orthoborate, zirconium orthoborate, niobium orthoborate, molybdenum orthoborate, ruthenium orthoborate, rhodium orthoborate, palladium orthoborate, silver orthoborate, cadmium orthoborate, indium orthoborate, tin orthoborate, antimony orthoborate, tellurium orthoborate, cesium orthoborate, barium orthoborate, lanthanum orthoborate, hafnium orthoborate, tantalum orthoborate, tungsten orthoborate, rhenium orthoborate, osmium orthoborate, iridium orthoborate, platinum orthoborate, gold orthoborate, mercury orthoborate, thallium orthoborate, lead orthoborate, bismuth orthoborate, cerium orthoborate, praseodymium orthoborate, neodymium orthoborate, promethium orthoborate, samarium orthoborate, europium orthoborate, gadolinium orthoborate, terbium orthoborate, dysprosium orthoborate, holmium orthoborate, erbium orthoborate, thulium orthoborate, ytterbium orthoborate, lutetium orthoborate, lithium metaborate, beryllium metaborate, sodium metaborate, magnesium metaborate, aluminum metaborate, potassium metaborate, calcium metaborate, scandium metaborate, titanium metaborate, vanadium metaborate, chromium metaborate, manganese metaborate, iron metaborate, cobalt metaborate, nickel metaborate, copper metaborate, zinc metaborate, gallium metaborate, germanium metaborate, arsenic metaborate, selenium metaborate, rubidium metaborate, strontium metaborate, yttrium metaborate, zirconium metaborate, niobium metaborate, molybdenum metaborate, ruthenium metaborate, rhodium metaborate, palladium metaborate, silver metaborate, cadmium metaborate, indium metaborate, tin metaborate, antimony metaborate, tellurium metaborate, cesium metaborate, barium metaborate, lanthanum metaborate, hafnium metaborate, tantalum metaborate, tungsten metaborate, rhenium metaborate, osmium metaborate, iridium metaborate, platinum metaborate, gold metaborate, mercury metaborate, thallium metaborate, lead metaborate, bismuth metaborate, cerium metaborate, praseodymium metaborate, neodymium metaborate, promethium metaborate, samarium metaborate, europium metaborate, gadolinium metaborate, terbium metaborate, dysprosium metaborate, holmium metaborate, erbium metaborate, thulium metaborate, ytterbium metaborate, lutetium metaborate, lithium tetraborate, beryllium tetraborate, sodium tetraborate, magnesium tetraborate, aluminum tetraborate, potassium tetraborate, calcium tetraborate, scandium tetraborate, titanium tetraborate, vanadium tetraborate, chromium tetraborate, manganese tetraborate, iron tetraborate, cobalt tetraborate, nickel tetraborate, copper tetraborate, zinc tetraborate, gallium tetraborate, germanium tetraborate, arsenic tetraborate, selenium tetraborate, rubidium tetraborate, strontium tetraborate, yttrium tetraborate, zirconium tetraborate, niobium tetraborate, molybdenum tetraborate, ruthenium tetraborate, rhodium tetraborate, palladium tetraborate, silver tetraborate, cadmium tetraborate, indium tetraborate, tin tetraborate, antimony tetraborate, tellurium tetraborate, cesium tetraborate, barium tetraborate, lanthanum tetraborate, hafnium tetraborate, tantalum tetraborate, tungsten tetraborate, rhenium tetraborate, osmium tetraborate, iridium tetraborate, platinum tetraborate, gold tetraborate, mercury tetraborate, thallium tetraborate, lead tetraborate, bismuth tetraborate, cerium tetraborate, praseodymium tetraborate, neodymium tetraborate, promethium tetraborate, samarium tetraborate, europium tetraborate, gadolinium tetraborate, terbium tetraborate, dysprosium tetraborate, holmium tetraborate, erbium tetraborate, thulium tetraborate, ytterbium tetraborate, and lutetium tetraborate. These may be used alone or in combination.

— Metal Chromate—

Examples of the metal chromate include lithium chromate, beryllium chromate, sodium chromate, magnesium chromate, aluminum chromate, potassium chromate, calcium chromate, scandium chromate, titanium chromate, vanadium chromate, chromium chromate, manganese chromate, iron chromate, cobalt chromate, nickel chromate, copper chromate, zinc chromate, gallium chromate, germanium chromate, arsenic chromate, selenium chromate, rubidium chromate, strontium chromate, yttrium chromate, zirconium chromate, niobium chromate, molybdenum chromate, ruthenium chromate, rhodium chromate, palladium chromate, silver chromate, cadmium chromate, indium chromate, tin chromate, antimony chromate, tellurium chromate, cesium chromate, barium chromate, lanthanum chromate, hafnium chromate, tantalum chromate, tungsten chromate, rhenium chromate, osmium chromate, iridium chromate, platinum chromate, gold chromate, mercury chromate, thallium chromate, lead chromate, bismuth chromate, cerium chromate, praseodymium chromate, neodymium chromate, promethium chromate, samarium chromate, europium chromate, gadolinium chromate, terbium chromate, dysprosium chromate, holmium chromate, erbium chromate, thulium chromate, ytterbium chromate, lutetium chromate, lithium dichromate, beryllium dichromate, sodium dichromate, magnesium dichromate, aluminum dichromate, potassium dichromate, calcium dichromate, scandium dichromate, titanium dichromate, vanadium dichromate, chromium dichromate, manganese dichromate, iron dichromate, cobalt dichromate, nickel dichromate, copper dichromate, zinc dichromate, gallium dichromate, germanium dichromate, arsenic dichromate, selenium dichromate, rubidium dichromate, strontium dichromate, yttrium dichromate, zirconium dichromate, niobium dichromate, molybdenum dichromate, ruthenium dichromate, rhodium dichromate, palladium dichromate, silver dichromate, cadmium dichromate, indium dichromate, tin dichromate, antimony dichromate, tellurium dichromate, cesium dichromate, barium dichromate, lanthanum dichromate, hafnium dichromate, tantalum dichromate, tungsten dichromate, rhenium dichromate, osmium dichromate, iridium dichromate, platinum dichromate, gold dichromate, mercury dichromate, thallium dichromate, lead dichromate, bismuth dichromate, cerium dichromate, praseodymium dichromate, neodymium dichromate, promethium dichromate, samarium dichromate, europium dichromate, gadolinium dichromate, terbium dichromate, dysprosium dichromate, holmium dichromate, erbium dichromate, thulium dichromate, ytterbium dichromate, and lutetium dichromate. These may be used alone or in combination.

—Metal Silicate—

Examples of the metal silicate include lithium silicate, beryllium silicate, sodium silicate, magnesium silicate, aluminum silicate, potassium silicate, calcium silicate, scandium silicate, titanium silicate, vanadium silicate, chromium silicate, manganese silicate, iron silicate, cobalt silicate, nickel silicate, copper silicate, zinc silicate, gallium silicate, germanium silicate, arsenic silicate, selenium silicate, rubidium silicate, strontium silicate, yttrium silicate, zirconium silicate, niobium silicate, molybdenum silicate, ruthenium silicate, rhodium silicate, palladium silicate, silver silicate, cadmium silicate, indium silicate, tin silicate, antimony silicate, tellurium silicate, cesium silicate, barium silicate, lanthanum silicate, hafnium silicate, tantalum silicate, tungsten silicate, rhenium silicate, osmium silicate, iridium silicate, platinum silicate, gold silicate, mercury silicate, thallium silicate, lead silicate, bismuth silicate, cerium silicate, praseodymium silicate, neodymium silicate, promethium silicate, samarium silicate, europium silicate, gadolinium silicate, terbium silicate, dysprosium silicate, holmium silicate, erbium silicate, thulium silicate, ytterbium silicate, and lutetium silicate. These may be used alone or in combination.

—Metal Arsenate—

Examples of the metal arsenate include lithium arsenate, beryllium arsenate, sodium arsenate, magnesium arsenate, aluminum arsenate, potassium arsenate, calcium arsenate, scandium arsenate, titanium arsenate, vanadium arsenate, chromium arsenate, manganese arsenate, iron arsenate, cobalt arsenate, nickel arsenate, copper arsenate, zinc arsenate, gallium arsenate, germanium arsenate, arsenic arsenate, selenium arsenate, rubidium arsenate, strontium arsenate, yttrium arsenate, zirconium arsenate, niobium arsenate, molybdenum arsenate, ruthenium arsenate, rhodium arsenate, palladium arsenate, silver arsenate, cadmium arsenate, indium arsenate, tin arsenate, antimony arsenate, tellurium arsenate, cesium arsenate, barium arsenate, lanthanum arsenate, hafnium arsenate, tantalum arsenate, tungsten arsenate, rhenium arsenate, osmium arsenate, iridium arsenate, platinum arsenate, gold arsenate, mercury arsenate, thallium arsenate, lead arsenate, bismuth arsenate, cerium arsenate, praseodymium arsenate, neodymium arsenate, promethium arsenate, samarium arsenate, europium arsenate, gadolinium arsenate, terbium arsenate, dysprosium arsenate, holmium arsenate, erbium arsenate, thulium arsenate, ytterbium arsenate, and lutetium arsenate. These may be used alone or in combination.

—Metal Permanganate—

Examples of the metal permanganate include lithium permanganate, beryllium permanganate, sodium permanganate, magnesium permanganate, aluminum permanganate, potassium permanganate, calcium permanganate, scandium permanganate, titanium permanganate, vanadium permanganate, chromium permanganate, manganese permanganate, iron permanganate, cobalt permanganate, nickel permanganate, copper permanganate, zinc permanganate, gallium permanganate, germanium permanganate, arsenic permanganate, selenium permanganate, rubidium permanganate, strontium permanganate, yttrium permanganate, zirconium permanganate, niobium permanganate, molybdenum permanganate, ruthenium permanganate, rhodium permanganate, palladium permanganate, silver permanganate, cadmium permanganate, indium permanganate, tin permanganate, antimony permanganate, tellurium permanganate, cesium permanganate, barium permanganate, lanthanum permanganate, hafnium permanganate, tantalum permanganate, tungsten permanganate, rhenium permanganate, osmium permanganate, iridium permanganate, platinum permanganate, gold permanganate, mercury permanganate, thallium permanganate, lead permanganate, bismuth permanganate, cerium permanganate, praseodymium permanganate, neodymium permanganate, promethium permanganate, samarium permanganate, europium permanganate, gadolinium permanganate, terbium permanganate, dysprosium permanganate, holmium permanganate, erbium permanganate, thulium permanganate, ytterbium permanganate, and lutetium permanganate. These may be used alone or in combination.

—Simple Metal—

Examples of the simple metal include lithium, beryllium, sodium, magnesium, aluminum, potassium, calcium, scandium, titanium, vanadium, chromium, manganese, iron, cobalt, nickel, copper, zinc, gallium, germanium, arsenic, selenium, rubidium, strontium, yttrium, zirconium, niobium, molybdenum, ruthenium, rhodium, palladium, silver, cadmium, indium, tin, antimony, tellurium, cesium, barium, lanthanum, hafnium, tantalum, tungsten, rhenium, osmium, iridium, platinum, gold, mercury, thallium, lead, bismuth, cerium, praseodymium, neodymium, promethium, samarium, europium, gadolinium, terbium, dysprosium, holmium, erbium, thulium, ytterbium, and lutetium. These may be used alone or in combination. Among them, nickel and iron are preferable.

—Alloy—

Examples of the alloy formed of two kinds of metals include an alloy of a Group 1 element and a Group 1 element, an alloy of a Group 1 element and a Group 2 element, an alloy of a Group 1 element and a Group 3 element, an alloy of a Group 1 element and a Group 4 element, an alloy of a Group 1 element and a Group 5 element, an alloy of a Group 1 element and a Group 6 element, an alloy of a Group 1 element and a Group 7 element, an alloy of a Group 1 element and a Group 8 element, an alloy of a Group 1 element and a Group 9 element, an alloy of a Group 1 element and a Group 10 element, an alloy of a Group 1 element and a Group 11 element, an alloy of a Group 1 element and a Group 12 element, an alloy of a Group 1 element and a Group 13 element, an alloy of a Group 1 element and a Group 14 element, an alloy of a Group 1 element and a Group 15 element, an alloy of a Group 1 element and a Group 16 element, an alloy of a Group 2 element and a Group 2 element, an alloy of a Group 2 element and a Group 3 element, an alloy of a Group 2 element and a Group 4 element, an alloy of a Group 2 element and a Group 5 element, an alloy of a Group 2 element and a Group 6 element, an alloy of a Group 2 element and a Group 7 element, an alloy of a Group 2 element and a Group 8 element, an alloy of a Group 2 element and a Group 9 element, an alloy of a Group 2 element and a Group 10 element, an alloy of a Group 2 element and a Group 11 element, an alloy of a Group 2 element and a Group 12 element, an alloy of a Group 2 element and a Group 13 element, an alloy of a Group 2 element and a Group 14 element, an alloy of a Group 2 element and a Group 15 element, an alloy of a Group 2 element and a Group 16 element, an alloy of a Group 3 element and a Group 3 element, an alloy of a Group 3 element and a Group 4 element, an alloy of a Group 3 element and a Group 5 element, an alloy of a Group 3 element and a Group 6 element, an alloy of a Group 3 element and a Group 7 element, an alloy of a Group 3 element and a Group 8 element, an alloy of a Group 3 element and a Group 9 element, an alloy of a Group 3 element and a Group 10 element, an alloy of a Group 3 element and a Group 11 element, an alloy of a Group 3 element and a Group 12 element, an alloy of a Group 3 element and a Group 13 element, an alloy of a Group 3 element and a Group 14 element, an alloy of a Group 3 element and a Group 15 element, an alloy of a Group 3 element and a Group 16 element, an alloy of a Group 4 element and a Group 4 element, an alloy of a Group 4 element and a Group 5 element, an alloy of a Group 4 element and a Group 6 element, an alloy of a Group 4 element and a Group 7 element, an alloy of a Group 4 element and a Group 8 element, an alloy of a Group 4 element and a Group 9 element, an alloy of a Group 4 element and a Group 10 element, an alloy of a Group 4 element and a Group 11 element, an alloy of a Group 4 element and a Group 12 element, an alloy of a Group 4 element and a Group 13 element, an alloy of a Group 4 element and a Group 14 element, an alloy of a Group 4 element and a Group 15 element, an alloy of a Group 4 element and a Group 16 element, an alloy of a Group 5 element and a Group 5 element, an alloy of a Group 5 element and a Group 6 element, an alloy of a Group 5 element and a Group 7 element, an alloy of a Group 5 element and a Group 8 element, an alloy of a Group 5 element and a Group 9 element, an alloy of a Group 5 element and a Group 10 element, an alloy of a Group 5 element and a Group 11 element, an alloy of a Group 5 element and a Group 12 element, an alloy of a Group 5 element and a Group 13 element, an alloy of a Group 5 element and a Group 14 element, an alloy of a Group 5 element and a Group 15 element, an alloy of a Group 5 element and a Group 16 element, an alloy of a Group 6 element and a Group 6 element, an alloy of a Group 6 element and a Group 7 element, an alloy of a Group 6 element and a Group 8 element, an alloy of a Group 6 element and a Group 9 element, an alloy of a Group 6 element and a Group 10 element, an alloy of a Group 6 element and a Group 11 element, an alloy of a Group 6 element and a Group 12 element, an alloy of a Group 6 element and a Group 13 element, an alloy of a Group 6 element and a Group 14 element, an alloy of a Group 6 element and a Group 15 element, an alloy of a Group 6 element and a Group 16 element, an alloy of a Group 7 element and a Group 7 element, an alloy of a Group 7 element and a Group 8 element, an alloy of a Group 7 element and a Group 9 element, an alloy of a Group 7 element and a Group 10 element, an alloy of a Group 7 element and a Group 11 element, an alloy of a Group 7 element and a Group 12 element, an alloy of a Group 7 element and a Group 13 element, an alloy of a Group 7 element and a Group 14 element, an alloy of a Group 7 element and a Group 15 element, an alloy of a Group 7 element and a Group 16 element, an alloy of a Group 8 element and a Group 8 element, an alloy of a Group 8 element and a Group 9 element, an alloy of a Group 8 element and a Group 10 element, an alloy of a Group 8 element and a Group 11 element, an alloy of a Group 8 element and a Group 12 element, an alloy of a Group 8 element and a Group 13 element, an alloy of a Group 8 element and a Group 14 element, an alloy of a Group 8 element and a Group 15 element, an alloy of a Group 8 element and a Group 16 element, an alloy of a Group 9 element and a Group 9 element, an alloy of a Group 9 element and a Group 10 element, an alloy of a Group 9 element and a Group 11 element, an alloy of a Group 9 element and a Group 12 element, an alloy of a Group 9 element and a Group 13 element, an alloy of a Group 9 element and a Group 14 element, an alloy of a Group 9 element and a Group 15 element, an alloy of a Group 9 element and a Group 16 element, an alloy of a Group 10 element and a Group 10 element, an alloy of a Group 10 element and a Group 11 element, an alloy of a Group 10 element and a Group 12 element, an alloy of a Group 10 element and a Group 13 element, an alloy of a Group 10 element and a Group 14 element, an alloy of a Group 10 element and a Group 15 element, an alloy of a Group 10 element and a Group 16 element, an alloy of a Group 11 element and a Group 11 element, an alloy of a Group 11 element and a Group 12 element, an alloy of a Group 11 element and a Group 13 element, an alloy of a Group 11 element and a Group 14 element, an alloy of a Group 11 element and a Group 15 element, an alloy of a Group 11 element and a Group 16 element, an alloy of a Group 12 element and a Group 12 element, an alloy of a Group 12 element and a Group 13 element, an alloy of a Group 12 element and a Group 14 element, an alloy of a Group 12 element and a Group 15 element, an alloy of a Group 12 element and a Group 16 element, an alloy of a Group 13 element and a Group 13 element, an alloy of a Group 13 element and a Group 14 element, an alloy of a Group 13 element and a Group 15 element, an alloy of a Group 13 element and a Group 16 element, an alloy of a Group 14 element and a Group 14 element, an alloy of a Group 14 element and a Group 15 element, an alloy of a Group 14 element and a Group 16 element, an alloy of a Group 15 element and a Group 15 element, an alloy of a Group 15 element and a Group 16 element, and an alloy of a Group 16 element and a Group 16 element. These may be used alone or in combination. More specific examples include 42alloy, KS steel, amalgam, an aluminum alloy, alumel, inconel, invar, widia, Wood's metal, elinvar, kanthal, galinstan, cunife, chromium molybdenum steel, chromel, silicon steel, Kovar, constantan, sanplatinum, duranickel, duralumin, silumin, sterling silver, stellite, stainless steel, spiegeleisen, sendust, a titanium alloy, tombac, a sodium-potassium alloy, nichrome, nordic gold, hastelloy, Babbitt metal, solder, permalloy, permendur, pewter, ferromanganese, white gold, a magnesium alloy, managing steel, manganese-molybdenum steel, misch metal, monel, Yasuki steel, brass, hard lead, steel, bronze, gold-copper alloy, red brass, cemented carbide, cupronickel, nickel silver, hydrogen storage alloy, a nickel-iron alloy, and a nickel-yttrium alloy. Among them, a nickel-iron alloy and a nickel-yttrium alloy are preferable.

Examples of the alloy formed of three or more kinds of metals include alloys combining 3 to 65 kinds of simple metals listed below; i.e., alloys combining three or more kinds of the following: lithium, beryllium, sodium, magnesium, aluminum, potassium, calcium, scandium, titanium, vanadium, chromium, manganese, iron, cobalt, nickel, copper, zinc, gallium, germanium, arsenic, selenium, rubidium, strontium, yttrium, zirconium, niobium, molybdenum, ruthenium, rhodium, palladium, silver, cadmium, indium, tin, antimony, tellurium, cesium, barium, lanthanum, hafnium, tantalum, tungsten, rhenium, osmium, iridium, platinum, gold, mercury, thallium, lead, bismuth, cerium, praseodymium, neodymium, promethium, samarium, europium, gadolinium, terbium, dysprosium, holmium, erbium, thulium, ytterbium, and lutetium. These may be used alone or in combination.

—Metal Compound Carried an Carrier—

In the present invention, the metal compound carried on the carrier refers to one in which the metal compound is carried on at least part of the surface of the carrier.

A mass of the metal compound carried on the carrier is not particularly limited and may be appropriately selected depending on the intended purpose. It is preferably in the range of 0.1% by mass to 50% by mass, more preferably in the range of 1% by mass to 40% by mass. The mass of the metal compound carried on the carrier (hereinafter may be referred to as "carried %") can be determined from the following formula:

Carried %={(Mass of the metal compound)/(Mass of the metal compound+Mass of the carrier)}×100

—Carrier—

The carrier is not particularly limited and may be appropriately selected depending on the intended purpose. Examples thereof include activated carbon, alumina, magnesia, ceria, titania, silica gel, silica alumina, zirconia, zeolite, hydrotalcite, diatomite, and cordierite.

The carrier in the metal compound carried on the carrier is not particularly limited and may be appropriately selected depending on the intended purpose. It is preferably alumina, silica gel, and silica alumina.

The metal compound in the metal compound carried on the carrier is not particularly limited and may be appropriately selected depending on the intended purpose. It is preferably lithium chloride, potassium chloride, barium chloride, calcium chloride, indium chloride, cerium chloride, cesium chloride, iron chloride, sodium chloride, and nickel chloride.

The metal compound carried on the carrier is not particularly limited and may be appropriately selected depending on the intended purpose. Examples thereof include lithium chloride carried on silica gel (hereinafter may be referred to as "lithium chloride/silica gel"), lithium chloride carried on silica alumina (hereinafter may be referred to as "lithium chloride/silica alumina"), lithium chloride carried on zirconia (hereinafter may be referred to as "lithium chloride/zirconia"), lithium chloride carried on zirconia tungstate (hereinafter may be referred to as "lithium chloride/zirconia tungstate"), lithium chloride carried on titania (hereinafter may be referred to as "lithium chloride/titania"), lithium chloride carried on alumina (hereinafter may be referred to as "lithium chloride/alumina"), lithium chloride carried on ceria (hereinafter may be referred to as "lithium chloride/ceria"), lithium chloride carried on magnesia (hereinafter may be referred to as "lithium chloride/magnesia"), lithium chloride carried on hydrotalcite (hereinafter may be referred to as "lithium chloride/hydrotalcite"), strontium chloride carried on silica gel (hereinafter may be referred to as "strontium chloride/silica gel"), strontium chloride carried on silica alumina (hereinafter may be referred to as "strontium chloride/silica alumina"), strontium chloride carried on zirconia (hereinafter may be referred to as "strontium chloride/zirconia"), strontium chloride carried on zirconia tungstate (hereinafter may be referred to as "strontium chloride/zirconia tungstate"), strontium chloride carried on titania (hereinafter may be referred to as "strontium chloride/titania"), strontium chloride carried on alumina (hereinafter may be referred to as "strontium chloride/alumina"), strontium chloride carried on ceria (hereinafter may be referred to as "strontium chloride/ceria"), strontium chloride carried on magnesia (hereinafter may be referred to as "strontium chloride/magnesia"), strontium chloride carried on hydrotalcite (hereinafter may be referred to as "strontium chloride/hydrotalcite"), and potassium chloride carried on alumina (hereinafter may be referred to as "potassium chloride/alumina"). These may be used alone or in combination. Among them, lithium chloride/alumina, lithium chloride/silica gel, lithium chloride/silica alumina, and potassium chloride/alumina are preferable.

—Reaction—

The reaction step may be performed in an open system or a closed system. From the viewpoint of being free of a problem with toxicity, a closed system is preferable.

A reaction device used in the reaction step (hereinafter the reaction device may be referred to as "reaction tube") is not particularly limited and may be appropriately selected depending on the intended purpose.

A reaction temperature in the reaction step is not particularly limited and may be appropriately selected depending on the intended purpose. It is preferably in the range of 300° C. to 750° C., more preferably in the range of 350° C. to 700° C., further preferably 400° C. to 650° C., particularly preferably 420° C. to 630° C.

A molar ratio (mol:mol) between methane and phosphorus trichloride is not particularly limited and may be appropriately selected depending on the intended purpose. It is preferably in the range of 20:1 to 1:1, further preferably in the range of 18:1 to 1:1, particularly preferably 15:1 to 1.5:1.

A reaction pressure in the reaction step is not particularly limited and may be appropriately selected depending on the intended purpose. It is preferably in the range of 500 mbar to 25 bar, particularly preferably 900 mbar to 10 bar.

A velocity at which the methane, the phosphorus trichloride, and the additive pass through the reaction tube (hereinafter the velocity may be referred to as "linear velocity") is not particularly limited and may be appropriately selected depending on the intended purpose. A total of the linear velocities of the methane, the phosphorus trichloride, and the additive is preferably in the range of 10 cm/minute to 5,000 cm/minute, more preferably in the range of 50 cm/minute to 3,000 cm/minute, further preferably in the range of 100 cm/minute to 2,000 cm/minute, particularly preferably in the range of 800 cm/minute to 1,800 cm/minute.

The additive may be introduced into a mixed gas of the methane and the phosphorus trichloride.

A concentration of the additive relative to the methane (Additive concentration (%)=Amount by mol of the additive/Amount by mol of the methane×100) is not particularly limited and may be appropriately selected depending on the intended purpose. It is preferably in the range of 0.05% to 10%, more preferably in the range of 0.1% to 7%, further preferably in the range of 0.2% to 5%.

<Other Steps>

The other steps are not particularly limited and may be appropriately selected depending on the intended purpose so long as the effects of the present invention are not degraded. Examples thereof include a recovery step of recovering reaction products from the reaction device through the reaction step.

A method for the recovery is not particularly limited and may be appropriately selected from known methods.

Note that, in the recovery step, the starting materials can also be recovered in addition to the reaction products. In this case, the reaction products and the starting materials are separated by, for example, a distillation treatment, and the obtained starting materials can be used again in the above-described <Reaction step>.

EXAMPLES

The production method of the present invention will be described below in detail by way of test examples. The present invention should not be construed as being limited to these test examples.

Test Example 1

Example 1

A quartz tube having a diameter of 12 mm and a length of 310 mm was charged with 0.5 g of nickel chloride, and was placed in an anti-rust tube that is heatable, followed by heating to 550° C. Methane was introduced to this reaction device at a linear velocity of 88 cm/minute. Phosphorus trichloride was introduced by bubbling methane in phosphorus trichloride maintained in temperature at 30° C. Also, oxygen was introduced so that the concentration of the oxygen relative to the methane would be 1% (amount by mol of the oxygen/amount by mol of the methane×100). The reaction mixture discharged from the reaction device was recovered in a vessel cooled to 0° C. and containing ethanol. Note that, the reaction pressure in the reaction was set to 1.013 bar.

This ethanol mixture solution was analyzed through gas chromatography. The yield of methyldichlorophosphane was 22.6%.

Note that, the yield of methyldichlorophosphane was calculated as a production yield, relative to the phosphorus trichloride used, of methylethoxyphosphane that was produced through reaction between methyldichlorophosphane and ethanol (the same applies in the following test examples).

Examples 2 to 14

The reactions were performed under the same conditions as in Example 1 except that nickel chloride was changed to the metal compounds or the metal compounds carried on the carriers described in Table 1.

Note that, the metal compounds carried on the carriers in Examples 12 to 14 (lithium chloride/alumina, lithium chloride/silica gel, and lithium chloride/silica alumina) were prepared in the following manner.

Specifically, 0.61 g of lithium chloride was dissolved in 5 mL of water. To this solution, 1.90 g of dried alumina, silica gel, or silica alumina was added. The resultant mixture was left to stand for 1 hour at room temperature, followed by drying at 110° C. overnight.

Table 1 presents the yields of methyldichlorophosphane in Examples 2 to 14.

TABLE 1

| Example | Metal compounds or metal compounds carried on carriers | Yield |
| --- | --- | --- |
| 2 | Cobalt chloride | 22.9% |
| 3 | Gadolinium chloride | 23.3% |
| 4 | Ytterbium chloride | 21.2% |
| 5 | Holmium chloride | 22.6% |
| 6 | Cadmium chloride | 21.8% |
| 7 | Strontium chloride | 23.4% |
| 8 | Nickel fluoride | 22.6% |
| 9 | Nickel bromide | 21.6% |
| 10 | Nickel | 22.3% |
| 11 | Nickel oxide | 21.8% |
| 12 | Lithium chloride/alumina | 21.7% |
| 13 | Lithium chloride/silica gel | 22.0% |
| 14 | Lithium chloride/silica alumina | 21.3% |

Comparative Example 1

The reaction was performed under the same conditions as in Example 1 except that nickel chloride was not used and oxygen was not introduced. The yield of methyldichlorophosphane was 5.7%.

Comparative Example 2

The reaction was performed under the same conditions as in Example 1 except that nickel chloride was not used. The yield of methyldichlorophosphane was 18.1%.

Comparative Example 3

The reaction was performed under the same conditions as in Example 1 except that nickel chloride was not used and alumina was used as a carrier. The yield of methyldichlorophosphane was 17.0%.

Test Example 2

Example 15

A quartz tube having a diameter of 6 mm and a length of 310 mm was charged with 0.5 g of nickel, and was placed in an anti-rust tube that is heatable, followed by heating to 550° C. Methane was introduced to this reaction device at a linear velocity of 1,061 cm/minute. Phosphorus trichloride was introduced by bubbling methane in phosphorus trichloride of room temperature. Also, oxygen was introduced so that the concentration of the oxygen relative to the methane would be 1% (amount by mol of the oxygen/amount by mol of the methane×100). The reaction mixture discharged from the reaction device was recovered in a vessel cooled to 0° C. and containing ethanol. Note that, the reaction pressure in the reaction was set to 1.013 bar.

This ethanol mixture solution was analyzed through gas chromatography. The yield of methyldichlorophosphane was 24.4%.

Comparative Example 4

The reaction was performed under the same conditions as in Example 15 except that nickel was not used. The yield of methyldichlorophosphane was 16.8%.

Examples 16 to 31

The reactions were performed under the same conditions as in Example 15 except that nickel was changed to the metal compounds or the metal compounds carried on the carriers described in Table 2.

Note that, the metal compound carried on the carrier in Example 31 (potassium chloride/alumina) was prepared in the following manner.

Specifically, 0.19 g of potassium chloride was dissolved in 5 mL of water. To this solution, 1.90 g of dried alumina was added. The resultant mixture was left to stand for 1 hour at room temperature, followed by drying at 110° C. overnight.

Table 2 presents the yields of methyldichlorophosphane in Examples 16 to 31.

TABLE 2

| Example | Metal compounds or metal compounds carried on carriers | Yield |
| --- | --- | --- |
| 16 | Indium chloride | 26.6% |
| 17 | Cobalt chloride | 22.8% |
| 18 | Cesium chloride | 25.0% |
| 19 | Strontium oxide | 25.6% |
| 20 | Cobalt oxide | 23.0% |
| 21 | Indium oxide | 21.9% |
| 22 | Niobium carbide | 22.6% |
| 23 | Tantalum carbide | 22.8% |
| 24 | Silicon carbide | 21.7% |
| 25 | Tantalum boride | 21.9% |
| 26 | Zirconium boride | 27.4% |
| 27 | Nickel boride | 26.3% |
| 28 | Iron | 21.2% |
| 29 | Nickel iron alloy | 26.3% |
| 30 | Nickel yttrium alloy | 26.1% |
| 31 | Potassium chloride/alumina | 26.0% |

From the results of Test Example 2, it was confirmed that even when the diameter of the reaction tube and the linear velocities of, for example, methane were changed, methyldichlorophosphane could be produced at high yields by allowing methane and phosphorus trichloride to react in the presence of the additive using the metal compound, or the metal compound carried on the carrier, or bath thereof.

Test Example 3

Examples 32 to 35

The reaction was performed under the same conditions as in Example 15 except that nickel was changed to cesium chloride, the linear velocity of oxygen was changed to the linear velocity described in Table 3, and nitrogen at the linear velocity described in Table 3 was used to adjust the total of the linear velocities of methane, phosphorus trichloride, oxygen, and nitrogen to 1,097 cm/minute. In Example 35, however, oxygen diluted with argon to a concentration of 10% was used instead of oxygen.

Table 3 presents the yields of methyldichlorophosphane in Examples 32 to 35.

TABLE 3

| Example | Metal compounds or metal compounds carried on carriers | Linear velocity of oxygen (cm/minute) | Linear velocity of nitrogen (cm/minute) | Yield |
| --- | --- | --- | --- | --- |
| 32 | Cesium chloride | 15.9 | 19.5 | 27.9% |
| 33 | | 10.6 | 24.8 | 24.4% |
| 34 | | 5.3 | 30.1 | 21.8% |
| 35 | | 10.6 | 24.8 | 20.3% |

Comparative Examples 5 to 8

The reaction was performed under the same conditions as in Examples 32 to 35 except that cesium chloride was not used.

Table 4 presents the yields of methyldichlorophosphane in Comparative Examples 5 to 8.

TABLE 4

| Comparative Example | Metal compounds or metal compounds carried on carriers | Linear velocity of oxygen (cm/minute) | Linear velocity of nitrogen (cm/minute) | Yield |
| --- | --- | --- | --- | --- |
| 5 | None | 15.9 | 19.5 | 23.6% |
| 6 | | 10.6 | 24.8 | 21.5% |
| 7 | | 5.3 | 30.1 | 17.7% |
| 8 | | 10.6 | 24.8 | 12.1% |

From the results of Test Example 3, it was confirmed that even when the linear velocity of the additive was changed, methyldichlorophosphane could be produced at high yields by allowing methane and phosphorus trichloride to react in the presence of the additive using the metal compound, or the metal compound carried on the carrier, or both thereof.

Test Example 4

Examples 36 to 38

The reaction was performed under the same conditions as in Example 15 except that 0.5 g of nickel was changed to 1.0 g of cesium chloride and phosphorus trichloride having the temperature described in Table 5 was used.

Table 5 presents the yields of methyldichlorophosphane in Examples 36 to 38.

TABLE 5

| Example | Metal compounds or metal compounds carried on carriers | Temperature of phosphorus trichloride (° C.) | Yield |
| --- | --- | --- | --- |
| 36 | Cesium chloride | 0 | 20.2% |
| 37 | | 30 | 24.4% |
| 38 | | 60 | 12.7% |

Comparative Examples 9 to 11

The reaction was performed under the same conditions as in Examples 36 to 38 except that cesium chloride was not used.

Table 6 presents the yields of methyldichlorophosphane in Comparative Examples 9 to 11.

TABLE 6

| Comparative Example | Metal compounds or metal compounds carried on carriers | Temperature of phosphorus trichloride (° C.) | Yield |
| --- | --- | --- | --- |
| 9 | None | 0 | 13.4% |
| 10 | | 30 | 21.1% |
| 11 | | 60 | 9.6% |

From the results of Test Example 4, it was confirmed that even when the temperature of phosphorus trichloride used was changed (the molar ratio between methane and phosphorus trichloride was changed), methyldichlorophosphane could be produced at high yields by allowing methane and phosphorus trichloride to react in the presence of the additive using the metal compound, or the metal compound carried on the carrier, or both thereof.

Test Example 5

Example 39

The reaction was performed under the same conditions as in Example 15 except that nickel was changed to cesium chloride and air was used instead of oxygen. Here, air was introduced so that the concentration of the oxygen relative to the methane would be 1% (amount by mol of the oxygen/amount by mol of the methane×100).

The yield of methyldichlorophosphane was 25.7%.

Comparative Example 12

The reaction was performed under the same conditions as in Example 39 except that cesium chloride was not used.

The yield of methyldichlorophosphane was 21.7%.

From the results of Test Example 5, it was confirmed that even when air was used as the additive, methyldichlorophosphane could be produced at high yields by allowing methane and phosphorus trichloride to react in the presence of the additive using the metal compound, or the metal compound carried on the carrier, or both thereof.

Test Example 6

In the method described in Patent Literature 8 (U.S. Pat. No. 3,210,418) and Non-Patent Literature 1 (JOHN A. PIANFETTI, et al., JOURNAL OF THE AMERICAN CHEMICAL SOCIETY, 1962, Vol. 84, pp. 851 to 854), methyldichlorophosphinic acid is formed as a by-product. Whether methyldichlorophosphinic acid was formed as a by-product in the case of using the production method of the present invention was analyzed by gas chromatography mass spectrometry. The analysis method and analysis conditions of gas chromatography mass spectrometry are as follows.

<Analysis Method>
Column: Rtx-5MS 30 m×0.25 mm×0.25 μm
Injection amount: 1 μL
Carrier gas: helium <Analysis Conditions>
60° C.: 5 minutes, heated to 110° C. at 10° C./minute, heated to 230° C. at 20° C./minute, 230° C.: 3 minutes Note that, a sample for analysis used was a reaction liquid that was directly recovered without ethanol trapping.

Rf(methane): 1.2 minutes, Rf(dichloromethane): 2.2 minutes, Rf(phosphorus trichloride): 3.4 minutes, Rf(methyldichlorophosphane): 4.1 minutes, Rf(methyl dichlorophosphite): 5.3 minutes, Rf(phosphorus oxychloride): 6.4 minutes, Rf(methyldichlorophosphinic acid): 10.8 minutes.

Figure 2:
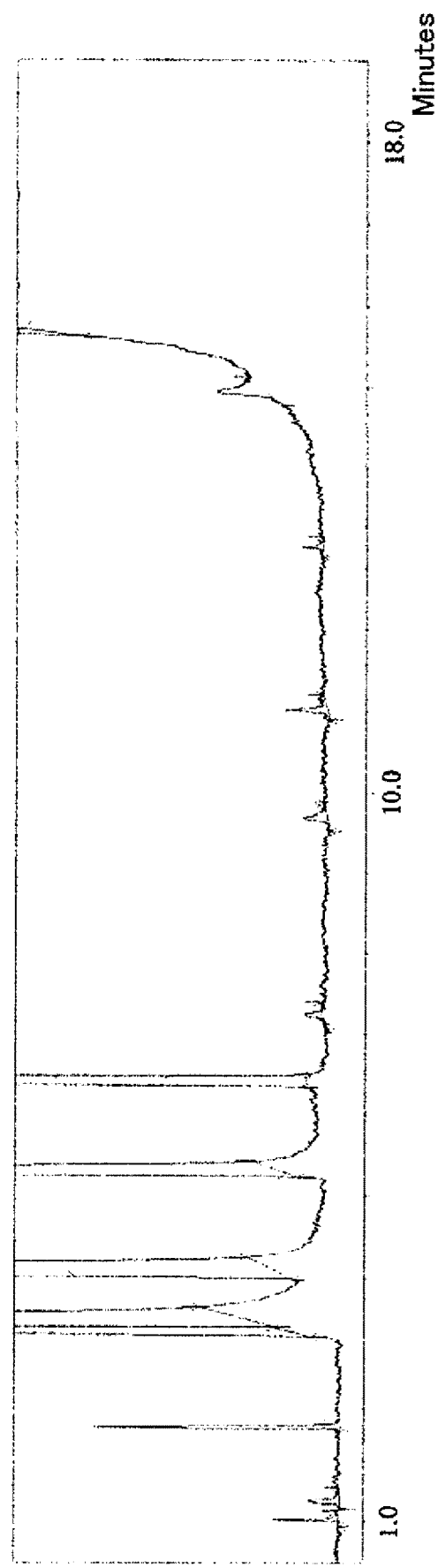
FIG. 2 is a chart of spectral data obtained from gas chromatography mass spectrometry of a reaction liquid of Example 22.
Figure 3:
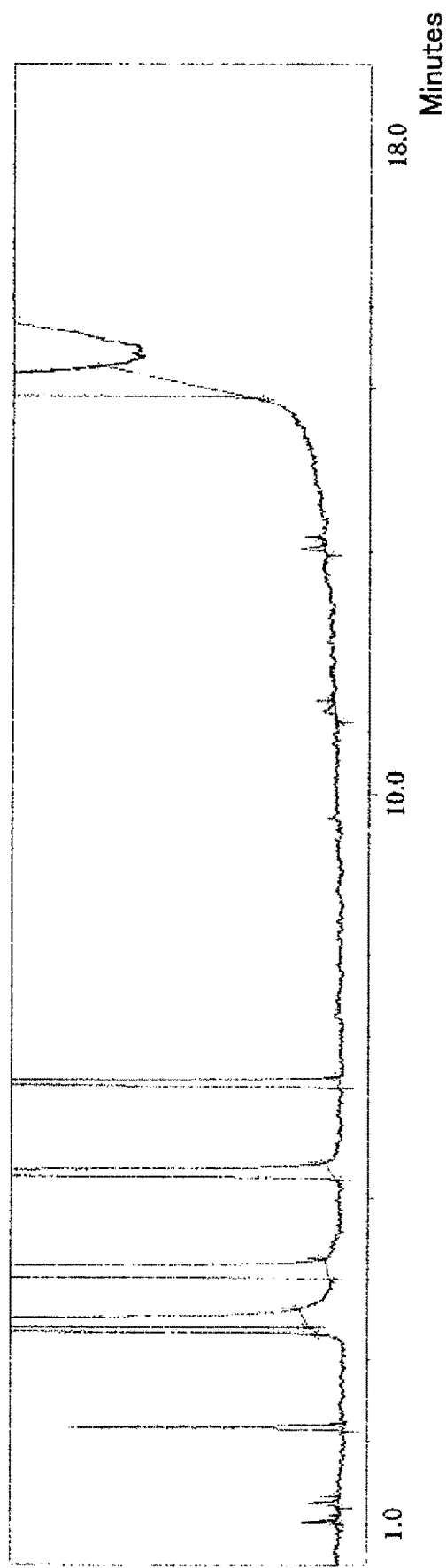
FIG. 3 is a chart of spectral data obtained from gas chromatography mass spectrometry of a reaction liquid of Example 25.
Figure 4:
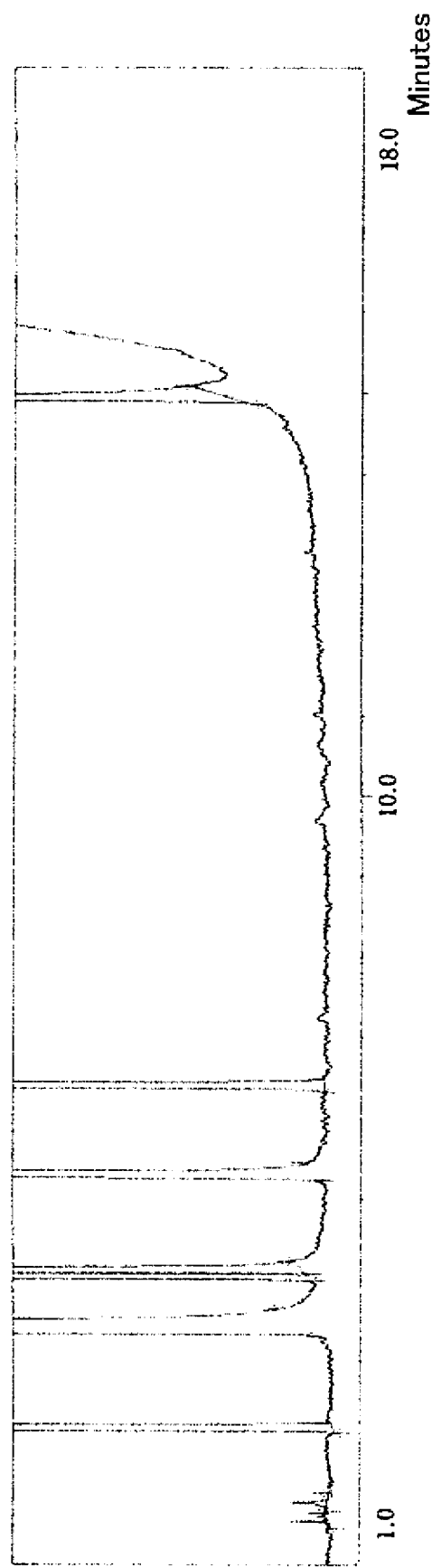
FIG. 4 is a chart of spectral data obtained from gas chromatography mass spectrometry of a reaction liquid of Example 29.
Figure 5:
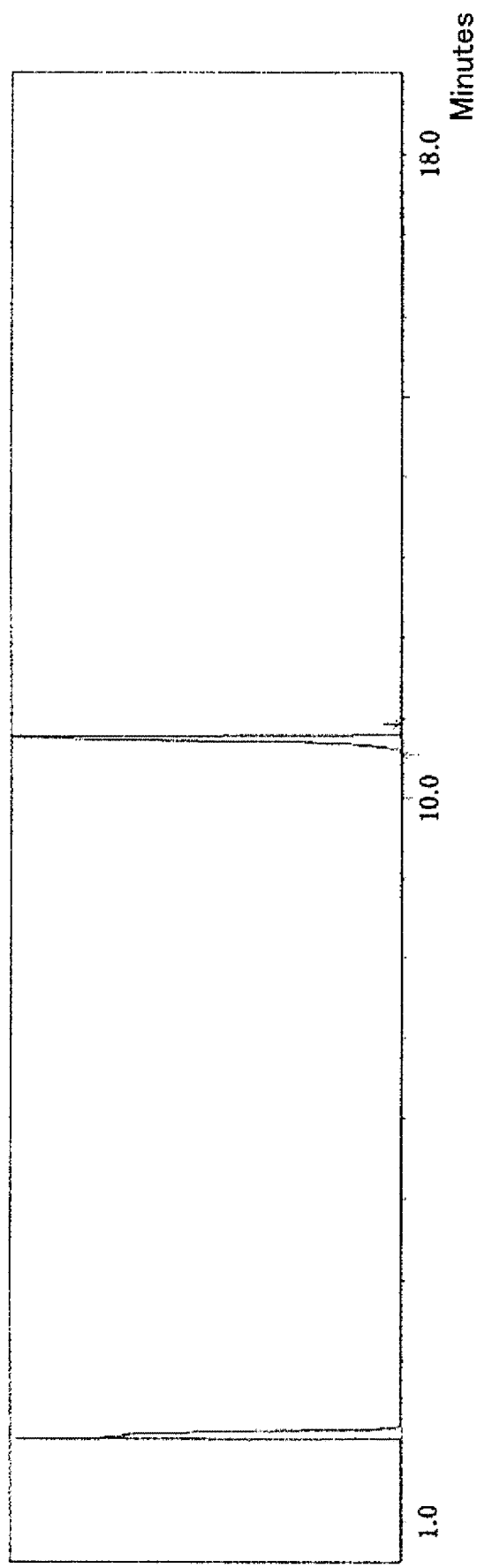
FIG. 5 is a chart of spectral data obtained from gas chromatography mass spectrometry of a standard sample of methyldichlorophosphinic acid.

FIG. 1 presents spectral data obtained from gas chromatography mass spectrometry of the reaction liquid of Example 15, FIG. 2 presents spectral data obtained from gas chromatography mass spectrometry of the reaction liquid of Example 22, FIG. 3 presents spectral data obtained from gas chromatography mass spectrometry of the reaction liquid of Example 25, FIG. 4 presents spectral data obtained from gas chromatography mass spectrometry of the reaction liquid of Example 29, and FIG. 5 presents spectral data obtained from gas chromatography mass spectrometry of a standard sample of methyldichlorophosphinic acid.

As presented in FIG. 5, the peak of methyldichlorophosphinic acid is observed at a retention time of 10.766 minutes, but no corresponding peak to methyldichlorophosphinic acid was observed in FIGS. 1 to 4. Therefore, it was confirmed that in the case of using the production method of the present invention, methyldichlorophosphinic acid was not formed as a by-product.

According to the production method of the present invention, it is possible to produce methyldichlorophosphane useful as, for example, an intermediate of an herbicide at an excellent yield, while giving less environmental loads due to formation of wastes and suppressing formation of by-products. This makes it possible to improve safety to the surrounding environment and cost saving. Also, since this method does not use a highly toxic compound that has a low boiling point and is highly likely to be released into the environment, safety to the workers and surrounding environment can be more improved.

Aspects of the present invention are, for example, as follows.

<1> A method for producing methyldichlorophosphane, the method including:
allowing methane and phosphorus trichloride to react in the presence of an additive using a metal compound, or a metal compound carried on a carrier, or both thereof.

<2> The method according to <1>, wherein the additive is at least one kind selected from the group consisting of oxygen and chlorine.

<3> The method according to <1> or <2>, wherein the metal compound is at least one kind selected from the group consisting of a metal halide, a metal nitrate, a metal nitrite, a metal sulfate, a metal sulfite, a metal oxide, a complex metal oxide, a metal peroxide, a metal halide complex, zeolite, a metal boride, a metal silicide, a metal nitride, a metal sulfide, a metal phosphide, a metal antimonide, a metal selenide, a metal carbide, a metal chlorate, a metal perchlorate, a metal bromate, a metal perbromate, a metal iodate, a metal periodate, a metal oxalate, a metal carbonate, a metal phosphate, a metal phosphite, a metal hypophosphite, a metal borate, a metal chromate, a metal silicate, a metal arsenate, a metal permanganate, a simple metal, and an alloy.

<4> The method according to any one of <1> to <3>, wherein the metal compound is at least one kind selected from the group consisting of a metal halide, a metal oxide, a metal boride, a metal carbide, an alloy, and a simple metal.

<5> The method according to <3> or <4>, wherein the metal halide is at least one kind selected from the group consisting of indium chloride, cesium chloride, rubidium chloride, chromium chloride, calcium chloride, lanthanum chloride, lithium chloride, potassium chloride, barium chloride, cerium chloride, iron chloride, sodium chloride, nickel chloride, holmium chloride, strontium chloride, cobalt chloride, gadolinium chloride, ytterbium chloride, cadmium chloride, nickel fluoride, and nickel bromide.

<6> The method according to <3> or <4>, wherein the metal oxide is at least one kind selected from the group consisting of strontium oxide, indium oxide, cobalt oxide, palladium oxide, and nickel oxide.

<7> The method according to <3> or <4>, wherein the metal boride is at least one kind selected from the group consisting of zirconium boride, titanium boride, nickel boride, lanthanum boride, aluminum boride, and tantalum boride.

<8> The method according to <3> or <4>, wherein the metal carbide is at least one kind selected from the group consisting of titanium carbide, zirconium carbide, niobium carbide, tantalum carbide, chromium carbide, and silicon carbide.

<9> The method according to <3> or <4>, wherein the alloy is at least one kind selected from the group consisting of a nickel-iron alloy and a nickel-yttrium alloy.

<10> The method according to <3> or <4>, wherein the simple metal is at least one kind selected from the group consisting of nickel and iron.

<11> The method according to any one of <1> to <10>, wherein the carrier is at least one kind selected from the group consisting of activated carbon, alumina, magnesia, ceria, titania, silica gel, silica alumina, zirconia, zeolite, hydrotalcite, diatomite, and cordierite.

<12> The method according to <1>, wherein the carrier in the metal compound carried on the carrier is at least one kind selected from the group consisting of alumina, silica gel, and silica alumina, and the metal compound in the metal compound carried on the carrier is at least one kind selected from the group consisting of lithium chloride, potassium chloride, barium chloride, calcium chloride, indium chloride, cerium chloride, cesium chloride, iron chloride, sodium chloride, and nickel chloride.

INDUSTRIAL APPLICABILITY

According to the present invention, it is possible to industrially advantageously produce methyldichlorophosphane while giving less environmental loads. Hence, it is possible to supply inexpensively and stably an amount that is required as chemical products produced using it as a starting material. The present invention can make a great contribution to the production of especially 2-amino-4-(hydroxymethylphosphinyl)butanoic acid and L-2-amino-4-(hydroxymethylphosphinyl)butanoic acid, which are used as herbicides.

The invention claimed is:

1. A method for producing methyldichlorophosphane, the method comprising:
    allowing methane and phosphorus trichloride to react in the presence of an additive and of a metal compound, or a metal compound carried on a carrier, or both thereof,
    wherein the additive is selected from the group consisting of oxygen, chlorine, and a combination thereof,
    wherein the metal compound or the metal compound in the metal compound carried on the carrier is selected from the group consisting of a metal halide, a metal oxide, a metal boride, a metal carbide, an alloy, a simple metal, and combinations of two or more kinds thereof,
    wherein the metal halide is selected from the group consisting of indium chloride, cesium chloride, rubidium chloride, chromium chloride, calcium chloride, lanthanum chloride, lithium chloride, potassium chloride, barium chloride, cerium chloride, iron chloride, sodium chloride, nickel chloride, holmium chloride, strontium chloride, cobalt chloride, gadolinium chloride, ytterbium chloride, cadmium chloride, nickel fluoride, nickel bromide, and combinations of two or more kinds thereof,
    wherein the metal oxide is selected from the group consisting of strontium oxide, indium oxide, palladium oxide, nickel oxide, and combinations of two or more kinds thereof,
    wherein the metal boride is selected form the group consisting of zirconium boride, titanium boride, nickel boride, lanthanum boride, aluminum boride, tantalum boride, and combination of two or more kinds thereof,
    wherein the metal carbide is selected from the group consisting of titanium carbide, zirconium carbide, niobium carbide, tantalum carbide, chromium carbide, silicon carbide, and combinations of two or more kinds thereof,
    wherein the alloy comprises a nickel-yttrium alloy,
    wherein the simple metal is selected form the group consisting of nickel, iron, and a combination thereof, and
    wherein the carrier in the metal compound carried on the carrier is selected from the group consisting of activated carbon, alumina, magnesia, ceria, titania, silica gel, silica alumina, zirconia, zeolite, hydrotalcite, diatomite, cordierite, and combinations of two or more kinds thereof.

2. The method according to claim 1, wherein the carrier in the metal compound carried on the carrier is selected from the group consisting of alumina, silica gel, silica alumina, and combinations of two or more kinds thereof, and the metal compound in the metal compound carried on the carrier is selected from the group consisting of lithium chloride, potassium chloride, barium chloride, calcium chloride, indium chloride, cerium chloride, cesium chloride, iron chloride, sodium chloride, nickel chloride, and combinations of two or more kinds thereof.

3. The method according to claim 1, wherein methyldichlorophosphinic acid is not formed as a by-product during production of methyldichlorophosphane.

* * * * *